(12) United States Patent
Lotto

(10) Patent No.: US 11,403,797 B2
(45) Date of Patent: *Aug. 2, 2022

(54) DYNAMIC LOCATION BASED DIGITAL ELEMENT

(71) Applicant: Ripple, Inc. of Delaware, New York, NY (US)

(72) Inventor: Ray Beau Lotto, Oxford (GB)

(73) Assignee: Ripple, Inc. of Delaware, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,343

(22) Filed: Dec. 22, 2020

(65) Prior Publication Data

US 2021/0174566 A1   Jun. 10, 2021

Related U.S. Application Data

(63) Continuation of application No. 15/817,027, filed on Nov. 17, 2017, now Pat. No. 10,930,038, which is a continuation-in-part of application No. 14/301,142, filed on Jun. 10, 2014, now Pat. No. 10,026,226.

(60) Provisional application No. 62/426,164, filed on Nov. 23, 2016.

(51) Int. Cl.
| | |
|---|---|
| *G06F 3/048* | (2013.01) |
| *G09G 5/00* | (2006.01) |
| *G06T 11/60* | (2006.01) |
| *G06Q 50/00* | (2012.01) |
| *H04W 4/021* | (2018.01) |
| *G06Q 10/10* | (2012.01) |
| *G06F 3/16* | (2006.01) |
| *G06F 3/04845* | (2022.01) |

(52) U.S. Cl.
CPC .............. *G06T 11/60* (2013.01); *G06F 3/167* (2013.01); *G06Q 10/10* (2013.01); *G06Q 10/109* (2013.01); *G06Q 50/01* (2013.01); *H04W 4/021* (2013.01); *G06F 3/04845* (2013.01); *G06F 2203/04806* (2013.01); *G06T 2200/24* (2013.01)

(58) Field of Classification Search
CPC .............................. G06T 19/006; G06T 11/60
USPC ......................................................... 345/633
See application file for complete search history.

(56) References Cited

U.S. PATENT DOCUMENTS

| | | |
|---|---|---|
| 5,613,048 A | 3/1997 | Chen |
| 5,795,228 A | 8/1998 | Trumbull |
| 5,943,427 A | 8/1999 | Massie |
| (Continued) | | |

FOREIGN PATENT DOCUMENTS

| | | |
|---|---|---|
| CA | 2690425 | 10/2010 |
| GB | 2507314 | 4/2014 |

OTHER PUBLICATIONS

Pielot et al., "PocketNavigator: Vibro-Tactile Waypoint Navigation for Everyday Mobile Devices", MobileHCI'10, Sep. 7-10, 2010 (Year: 2010).

*Primary Examiner* — Javid A Amini
(74) *Attorney, Agent, or Firm* — Van Pelt, Yi & James LLP

(57) ABSTRACT

A digital element located within a region near a device is identified. The digital element is located at a dynamically updated location. It is determined that the digital element is to be rendered. A representation of the digital element is generated in a rendered view of at least a portion of the (Continued)

region. Content of the digital element is provided upon receiving an indication that the digital element has been selected.

20 Claims, 21 Drawing Sheets

(56) References Cited

U.S. PATENT DOCUMENTS

| | | | |
|---|---|---|---|
| 6,037,936 | A | 3/2000 | Ellenby |
| 6,055,048 | A | 4/2000 | Langevin |
| 6,686,918 | B1 | 2/2004 | Cajolet |
| 7,113,610 | B1 | 9/2006 | Chrysanthakopoulos |
| 7,761,233 | B2 | 7/2010 | Schott |
| 8,473,200 | B1 | 6/2013 | Manber |
| 8,646,062 | B2 | 2/2014 | Bouz |
| 8,688,249 | B2 | 4/2014 | Vernon |
| 9,569,057 | B2 | 2/2017 | Ooka |
| 9,699,583 | B1 | 7/2017 | Lyren |
| 9,905,053 | B2 | 2/2018 | Yamamoto |
| 10,146,501 | B1 | 12/2018 | Park |
| 10,440,468 | B1 | 10/2019 | Kelley |
| 10,542,369 | B2 | 1/2020 | Miyazawa |
| 2002/0176636 | A1 | 11/2002 | Shefi |
| 2003/0051255 | A1 | 3/2003 | Bulman |
| 2004/0098343 | A1 | 5/2004 | Kawaki |
| 2004/0130525 | A1 | 7/2004 | Suchocki |
| 2006/0192783 | A1 | 8/2006 | Kass |
| 2006/0250402 | A1 | 11/2006 | Perlin |
| 2007/0130001 | A1 | 6/2007 | Jung |
| 2007/0162942 | A1* | 7/2007 | Hamynen .......... H04N 21/4524 725/105 |
| 2007/0242131 | A1* | 10/2007 | Sanz-Pastor ............ H04L 51/20 348/14.02 |
| 2007/0257915 | A1 | 11/2007 | Kutaragi |
| 2007/0275691 | A1 | 11/2007 | Boda |
| 2008/0252646 | A1 | 10/2008 | Pelletier |
| 2008/0292196 | A1 | 11/2008 | Jain |
| 2009/0141905 | A1 | 6/2009 | Warhol |
| 2009/0227266 | A1 | 9/2009 | Baik |
| 2009/0253512 | A1 | 10/2009 | Nickell |
| 2009/0273513 | A1 | 11/2009 | Huang |
| 2009/0278948 | A1 | 11/2009 | Hayashi |
| 2009/0282056 | A1 | 11/2009 | Patel |
| 2010/0004995 | A1 | 1/2010 | Hickman |
| 2010/0023878 | A1 | 1/2010 | Douris |
| 2010/0120450 | A1 | 5/2010 | Herz |
| 2010/0208057 | A1 | 8/2010 | Meier |
| 2010/0262579 | A1 | 10/2010 | Brown |
| 2010/0325563 | A1 | 12/2010 | Goldthwaite |
| 2010/0328344 | A1 | 12/2010 | Mattila |
| 2011/0063329 | A1 | 3/2011 | Choi |
| 2011/0098056 | A1 | 4/2011 | Rhoads |
| 2011/0141254 | A1* | 6/2011 | Roebke ................ H04N 7/18 348/61 |
| 2011/0178705 | A1 | 7/2011 | Pakzad |
| 2011/0188760 | A1 | 8/2011 | Wright |
| 2011/0238762 | A1 | 9/2011 | Soni |
| 2011/0279453 | A1 | 11/2011 | Murphy |
| 2011/0310227 | A1* | 12/2011 | Konertz ............... G06T 19/006 348/46 |
| 2012/0010853 | A1 | 1/2012 | Ploplys |
| 2012/0086728 | A1 | 4/2012 | McArdle |
| 2012/0134480 | A1 | 5/2012 | Leeds |
| 2012/0143361 | A1 | 6/2012 | Kurabayashi |
| 2012/0200667 | A1 | 8/2012 | Gay |
| 2012/0309518 | A1 | 12/2012 | Hansen |
| 2013/0147840 | A1 | 6/2013 | Seder |
| 2013/0148811 | A1 | 6/2013 | Siotis |
| 2013/0178257 | A1 | 7/2013 | Langseth |
| 2013/0182070 | A1 | 7/2013 | Peters |
| 2013/0182858 | A1 | 7/2013 | You |
| 2013/0218461 | A1 | 8/2013 | Naimark |
| 2013/0222426 | A1 | 8/2013 | Hymel |
| 2013/0249944 | A1 | 9/2013 | Raghoebardayal |
| 2013/0251156 | A1 | 9/2013 | Katayama |
| 2013/0271491 | A1 | 10/2013 | Anderson |
| 2013/0314402 | A1 | 11/2013 | Furumura |
| 2013/0314441 | A1 | 11/2013 | Grasset |
| 2014/0028718 | A1 | 1/2014 | Lindner |
| 2014/0055491 | A1* | 2/2014 | Malamud ........... G01C 21/3697 345/633 |
| 2014/0062900 | A1 | 3/2014 | Kaula |
| 2014/0063055 | A1* | 3/2014 | Osterhout ............... G06F 3/165 345/633 |
| 2014/0125699 | A1 | 5/2014 | Lotto |
| 2014/0180582 | A1 | 6/2014 | Pontarelli |
| 2014/0218361 | A1 | 8/2014 | Abe |
| 2014/0240552 | A1 | 8/2014 | Kasahara |
| 2014/0282220 | A1 | 9/2014 | Wantland |
| 2014/0300636 | A1* | 10/2014 | Miyazaya ............... H04S 7/304 345/633 |
| 2014/0357366 | A1 | 12/2014 | Koganezawa |
| 2014/0375683 | A1 | 12/2014 | Salter |
| 2015/0033159 | A1 | 1/2015 | Cho |
| 2015/0042681 | A1 | 2/2015 | Hart |
| 2015/0100270 | A1 | 4/2015 | Yuen |
| 2015/0153826 | A1 | 6/2015 | Ballard |
| 2015/0304531 | A1 | 10/2015 | Rodriguez Garcia |
| 2015/0332514 | A1 | 11/2015 | Lotto |
| 2018/0130258 | A1 | 5/2018 | Yamauchi |
| 2018/0157044 | A1 | 6/2018 | Choi |
| 2018/0350344 | A1 | 12/2018 | Zaslow |
| 2020/0296532 | A1 | 9/2020 | Wang |
| 2020/0374648 | A1 | 11/2020 | Robinson |
| 2021/0051148 | A1 | 2/2021 | Parikh |

* cited by examiner

DYNAMIC LOCATION BASED DIGITAL ELEMENT

CROSS REFERENCE TO OTHER APPLICATIONS

This application is a continuation of U.S. patent application Ser. No. 15/817,027, entitled DYNAMIC LOCATION BASED DIGITAL ELEMENT filed Nov. 17, 2017 which is incorporated herein by reference for all purposes, which claims priority to U.S. Provisional Application No. 62/426,164, entitled DYNAMIC LOCATION BASED DIGITAL ELEMENT filed Nov. 23, 2016 which is incorporated herein by reference for all purposes.

U.S. patent application Ser. No. 15/817,027 is a continuation in part of U.S. patent application Ser. No. 14/301,142, entitled RENDERING AN AUGMENTED REALITY OBJECT filed Jun. 10, 2014, now U.S. Pat. No. 10,026,226, which is incorporated herein by reference for all purposes

BACKGROUND OF THE INVENTION

The proliferation of digital activity and record keeping, both social and non-social, has drastically increased one's reliance on mobile devices to manage social interaction and personal record keeping. For example, it is common for a user to manage appointments, photos, personal records, and multiple forms of communication from a single smartphone device. As new features are added to mobile devices, new digital interaction patterns are developed. For example, improvements in location positioning technologies have led to the development of route guidance and location-based searching capabilities on mobile devices. As computing and other features of mobile devices continually improve, new digital interaction and record keeping capabilities can be developed to take advantage of the device capabilities.

BRIEF DESCRIPTION OF THE DRAWINGS

Various embodiments of the invention are disclosed in the following detailed description and the accompanying drawings.

DETAILED DESCRIPTION

Figure 1:
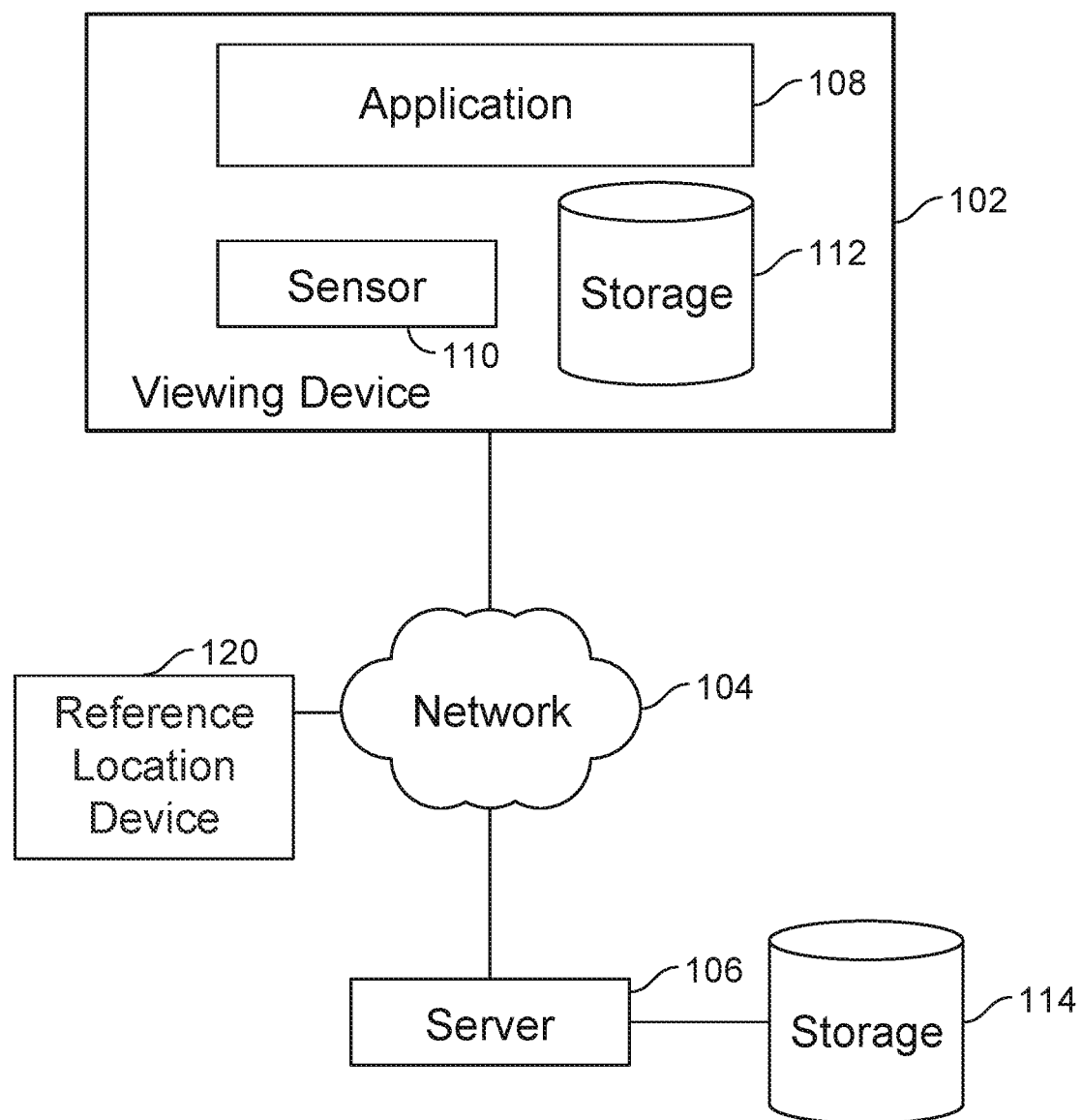
FIG. 1 is a block diagram illustrating an embodiment of a system for rendering a digital element.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rendering a digital element associated with a physical region is disclosed. For example, a digital element such as a message, a record, a digital file, a user profile, a coupon, a gift card credit, cryptocurrencies (and related), etc. is placed by a user for a specific geographical location. The specific geographic location may be fixed (e.g., placed at a specific fixed location coordinate) or may be placed at a location that can dynamically change (e.g., location of a device that can be moved to different locations) in another embodiment. The digital element may be retrieved by one or more users by visiting the geographical location of the digital element and using a computing device application to retrieve the digital element. In some embodiments, an augmented reality world view is displayed using the computing viewing device and a user desiring to retrieve the digital element may view a visual representation of the digital element at the physical location where the digital element was placed. For example, the user may explore a physical location using a mobile device application as a viewer. If any digital element of interest exists in the physical location shown in the viewer, a visual graphic (e.g., icon) representing the digital element is superimposed on the view of the physical location to create an augmented reality view of the digital element being located at the physical location. In some embodiments, the representation of the digital element is associated with an audio, tactile and/or other somatosensory feedback. For example, an audio, tactile and/or other somatosensory feedback may be provided via the device to indicate the digital element. If a user desires to obtain the digital element, the user may indicate that the user desires to obtain the digital element shown in the viewer of the mobile device application.

Improving the perception of an augmented reality object is disclosed. For example, when a digital object is rendered in an augmented reality environment (e.g., captured using a camera of a mobile device), the digital object placed at a geographical location coordinate may seem to move erratically in the augmented reality environment due to errors of a geographical location sensor of the mobile device. This erratic movement may seem jarring to a user and by limiting movement of the digital object within the augmented reality environment, the user may experience an enhanced user experience. In some embodiments, a new location of an observing platform is received. For example, a new location coordinate is received from a location service (e.g., determined using GPS) of a mobile device used to view an augmented reality environment. In some embodiments, a new relative position of an augmented reality object on a display associated with the observing platform is calculated. For example, a new location of a viewing device is detected (e.g., either due to the mobile device moving and/or due to errors of a location detector) and a new relative position of the augmented reality object with respect to the mobile device is calculated. In some embodiments, the display is updated using a filtered new relative position of the augmented reality object in a manner that reduces rate of change in motion of the augmented reality object on the display. For example, the augmented reality object is only allowed to move at a predetermined maximum rate. In another example, one or more previously received new locations of the viewing device are averaged with the new location to determine an averaged new location that is utilized to determine the filtered new relative position.

Rendering a digital element is disclosed. For example, an augmented reality object is rendered within an augmented reality world environment displayed on a screen (or projected into the eye). In some embodiments, a digital element to render is selected. For example, it is determined that a location and an orientation of a viewing device (e.g., mobile device) meet a criteria to render the digital element on a screen. A heading value of the digital element is determined based at least in part on a determined geographical location of an observing platform. For example, a compass directional heading from the geographical location of the viewing platform to the geographical location of the digital element is determined. A captured image associated with the geographical location of the device is obtained. For example, an image captured by a camera at the geographical location is obtained to be displayed as the augmented reality world environment. The digital element is rendered on the captured image at least in part by using the heading value. For example, the captured image includes an image of a range of directions around a center directional heading and a visual representation of the digital element is rendered over the captured image at the heading value that corresponds to its position in the range of directional headings captured by the image.

Rendering a digital element is disclosed. In some embodiments, an orientation of an observing platform is determined. For example, the observing platform is utilized to explore the augmented reality world that includes digital objects that are to be obtained. By orienting the observing platform in different directions, different portions of the augmented reality world environment may be displayed and explored on a display. It is determined whether a current rendering location of a digital element rendered on a captured image associated with a geographical location of the device meets a criteria. For example, it is determined whether a user is attempting to capture the digital element. In the event the current rendering location meets the criteria, a second rendering location of the digital element is biased using the detected orientation of the device. For example, a next rendering location of the digital element is biased to stay near its current rendering location rather than move to an updated rendering location.

FIG. 1 is a block diagram illustrating an embodiment of a system for rendering a digital element. Capture device 102 is connected to server 106 via network 104. Viewing device 102 may include one or more of the following: a smartphone, a tablet computer, a mobile device, a media player, a virtual reality display device, a head-mounted display, an optical head-mounted display, a wearable device, a wearable computer, a laptop computer, a desktop computer, and any other computing device. Device 102 includes application 108, sensor 110, and storage 112. In some embodiments, device 102 is used by a user to place and/or retrieve a digital element. Application 108 may include a software application that can be utilized to place, retrieve, and/or open a digital element. In some embodiments, application 108 includes a web browser. In some embodiments, application 108 includes a native application (e.g., Apple iOS application or Google Android application) for placing and/or retrieving a digital element. Sensor 110 may include one or more sensors: a location sensor, a Global Positioning System (GPS) sensor, a wireless local area (Wifi) network sensor, accelerometer, a gyroscope sensor, a device orientation sensor, a light sensor, a camera, a proximity sensor, a touch input sensor, and a microphone. In some embodiments, information from the sensor is used to place, retrieve, and/or display a digital element. For example, a current location and orientation of device 102 is obtained from sensor 110 and this information is used to determine which digital element to render on a screen of device 102.

Digital element reference location device 120 is connected to server 106 via network 104. In an example, a digital element is to be located at a location relative to a dynamically updated reference location (e.g., the digital element representative of a user is to be located at a location of a tracking device of the user) of digital element reference location device 120 and device 120 provides to server 106 a current location of device 120 that is utilized to update a location of its corresponding digital element.

For example, as reference location device 120 is moved in the physical world, reference location device 120 provides to server 106 via network 104 its location. This location information is then used to update the locations of one or more corresponding digital elements with locations that are linked to the location of reference location device 120. Examples of reference location device 120 include a mobile device, a computer device, a vehicle, a tag device, a beacon device, a location tracking device, a smart watch, a digital collar, and any radio signal emitting device. In some embodiments, location information of reference location device 120 is received/detected by an external device (e.g., hub/beacon signal receiving device) that provides the location information to server 106 via network 104. Digital element reference location device 120 includes one or more sensors and/or transmitters. Examples of these sensors and transmitters include a Global Positioning System (GPS) sensor, a wireless local area (Wifi) network sensor/transmitter, a personal area communication (e.g., Bluetooth) sensor/ transmitter, a cellular signal radio/sensor, accelerometer, a gyroscope sensor, a device orientation sensor, a light sensor, a camera, a proximity sensor, and/or a microphone that can be utilized to detect a location of device 120. A location of device 120 may be determined based on information detected by device 120 (e.g., detected GPS location) and/or based on a transmitted signal/information collected by sensors on other devices (e.g., based on signal detected by external beacons/hubs). For example, device 120 emits a signal that can be detected by other devices to determine (e.g., based on triangulation of signal strength) a location of device 120.

The digital element corresponding to device 120 may be specified to be located at a fixed relative distance offset from a reference location (e.g., reference location of device 120) in a specified direction away from the reference location. In some embodiments, the digital element is to be located at the longitude and latitude coordinate of the reference location of the reference location device but a vertical height location of the digital element has been set to be a fixed value (e.g., fixed height value or fixed relative height angle relative to a viewing platform). In some embodiments, a plurality of digital elements are placed with respect to a reference location of device 120. For example, digital elements are placed with respect to different offsets from the reference location of device 120. In various embodiments, there exists many different reference locations of devices for various different digital elements associated with dynamic locations.

In some embodiments, storage 112 stores configuration information, preferences, content cached information, a list/database, and/or other information associated with one or more digital elements. For example, storage 112 includes user configuration information and a cached database of digital elements located near device 102. In some embodiments, device 102 provides an augmented reality view displayed on a screen (e.g., a touch input display) of device 102. For example, an environment such as an image captured by a camera (e.g., sensor 110) of device 102 is modified to include a visual, sonic (e.g., audio), and/or somatic (e.g., tactile) representation of a digital element placed at a physical location depicted in the captured image.

In some embodiments, the location where the digital element is placed on the captured image is determined using a detected location of device 102. For example, a geographical location of device 102 is determined at least in part by using sensor 110 and the relative location of the digital element with respect to the device is calculated. Using the calculated relative location, the digital element is rendered on an augmented reality view displayed on a screen of device 102. For example, the digital element is associated with a geographical location coordinate and a heading (e.g., compass degree), and a distance between the detected location of device 102 and the location coordinate of the digital object is calculated. Using the heading and distance, the digital object may be rendered on a display of device 102 when a field of view of an augmented reality view displayed on the display includes the heading of the digital object (e.g., size of digital object may be scaled using the distance).

The detected location of device 102 may be unstable and change over time due to errors and limitations of using sensor 110 to detect the location. When the detected location is fluctuating even though the device is stationary, a digital element may seem to move around erratically in the augmented reality environment due to the changing relative location of the device with respect to a geographical location coordinate where the digital object is located. In order to stabilize the appearance of the digital object's perceived location yet allow for intended movement of the device to be accurately registered, a detected location of device 102 may be filtered to reduce the relative rate of change in motion of the digital object in the augmented reality environment. For example, the digital object is only allowed to move at most at a maximum predetermined rate. In another example, one or more previous consecutively detected locations of device 102 are averaged with the new location to determine an averaged new location that is utilized to determine a filtered new relative position.

A user may navigate the augmented reality view by moving device 102 (e.g., augmented reality observing platform) in the physical world and a corresponding view of the physical world captured by the camera of device 102 is augmented with visual, audio, tactile (e.g., haptic feedback) and other somatosensory representations of digital elements at appropriate locations and displayed on a screen of device 102. In some embodiments, rather than using images from a camera of device 102 to display the augmented reality world, a previously captured image and/or a virtual image may be utilized. In some embodiments, a user may retrieve/capture a digital element by performing a gesture with device 102 at an appropriate physical location by performing an input movement (e.g., touch detected on a touch screen of device 102 or a specific physical movement of device 102 detected by sensor 110).

In some embodiments, because the rendered location of the digital element may be unstable and change over time due to errors and limitations of using sensor 110 to detect the device location and variations in a dynamic location of the digital element (e.g., due to errors and limitations of detecting a reference location of reference location device 120 corresponding to the digital element), a digital object rendered on an augmented reality view displayed on a display of device 102 may be biased to remain on the display. For example, if a calculated heading of the digital object meets a criteria (e.g., heading of the digital object is within a preset range of a center heading of a field of view of the augmented reality view), the rendered location (e.g., heading) of the digital object is biased using a center heading of a field of view of the augmented reality view displayed on device 102.

In some embodiments, a user may retrieve/capture a digital element by hovering over the digital object for a preset amount of time. For example a center of a display of device 102 displays a target selection area (e.g., cross hairs) and when the digital object is aimed in the target selection area for at least a predetermined amount of time, the digital object is retrieved/captured. In some embodiments, because the rendered location of the digital element may be unstable and change over time due to errors and limitations of using sensor 110 to detect the device location, it may be difficult to aim and maintain the digital object within the target selection area. In some embodiments, a digital object rendered on an augmented reality view displayed on a display of device 102 may be biased to remain within a target selection area if the digital object is placed within the target area. For example, if a calculated heading of the digital object meets a criteria (e.g., heading of the digital object is within a preset range of a center heading of a target area of a field of view of the augmented reality view displayed on a screen of a viewing device), the rendered location (e.g., heading) of the digital object is biased using a heading pointed by the view device (e.g., heading pointed by orientation of device 102).

In some embodiments, a user may retrieve/capture a digital element by touching and/or holding (e.g., for a predetermined amount of time) the digital object on a touch input screen of the device. For example, a user may touch a rendered digital object on a display of device 102 to retrieve/capture the digital object. In some embodiments, because the rendered location of the digital element may be unstable and change over time due to errors and limitations of using sensor 110 to detect the device location, it may be difficult to aim and touch a fast moving digital object. In some embodiments, a digital object rendered on an augmented reality view displayed on a display of device 102 may be prevented from moving away from the display if the digital object is currently displayed on the display.

Server 106 may include a web server, a virtual server, and/or any other server that can provide information to device 102. In some embodiments, device 102 obtains information from server 106 via network 104. In some embodiments, application 108 communicates with server 106 to obtain one or more digital elements located near a location detected by sensor 110. For example, a location detected by sensor 110 is provided to server 106 and server 106 provides a list of digital elements (e.g., obtained from storage 114) that are located near the location and allowed to be accessed by a user of device 102. A location of a digital element may be a dynamically updated location based on a current location of a reference location device (e.g., reference location device 120) provided to server 106 by the reference location device 120. When a new reference location of a reference location device is received by server 106, server 106 updates the locations of one or more digital elements with dynamic locations based on the received reference location. In some embodiments, device 102 is provided the updated locations of any digital element desired by device 102 (e.g., updated locations of any digital element near current location of device 102). The updated location of digital elements may be pushed to device 102 and/or provided when device 102 requests an update of desired digital elements.

Device 102 renders a visual representation of the digital elements at appropriate locations within an augmented reality world view. When a user of device 102 selects a specific digital element, device 102 requests the specific digital element and the requested digital element is provided by server 106 from storage 114 and/or from a cached or local storage such as storage 112. Storage 114 is connected to server 106. Storage 114 may store user account information, digital elements, metadata associated with digital elements, and/or any other information associated with digital elements. For example, storage 114 includes a database repository of digital elements. In some embodiments, when a digital element is placed at a physical location using device 102, the digital element is provided to server 106 for storage in storage 114. In some embodiments, one or more placed digital elements may be private (e.g., only stored in storage 112) to device 102 and not provided to server 106 for storage. In some embodiments, storage 114 is directly connected to network 104 and server 106 may access storage 114 via network 104.

Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although single instances of components have been shown to simplify the diagram, additional instances of any of the components shown in FIG. 1 may exist. For example, multiple devices may be communicating with multiple servers that may be utilizing a cluster of server storage. Additional applications may be hosted by device 102. Components not shown in FIG. 1 may also exist.

Figure 2:
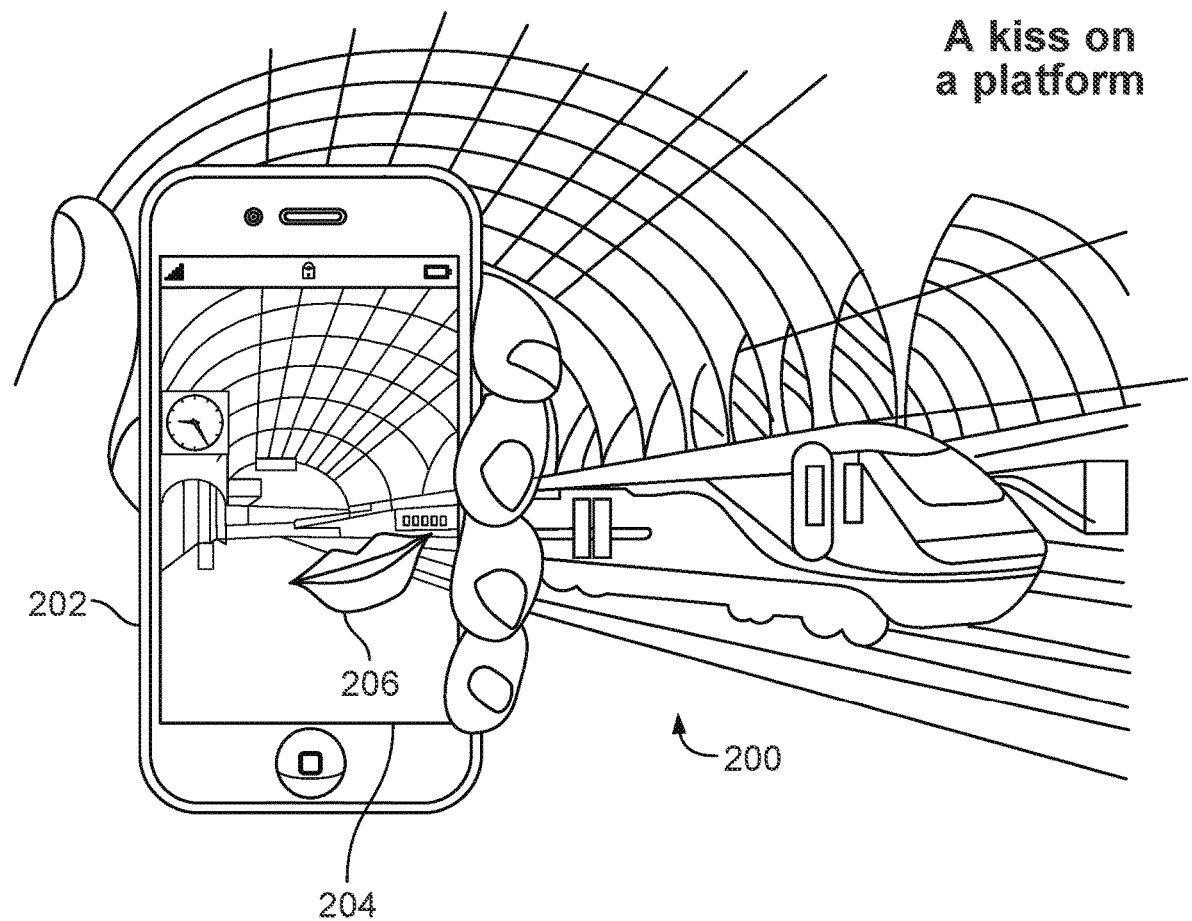
FIG. 2 is a diagram illustrating an embodiment of a rendered visual representation of a digital element.

FIG. 2 is a diagram illustrating an embodiment of a rendered visual representation of a digital element. Device 202 is a smartphone device. In some embodiments, device 202 is included in device 102 of FIG. 1. Device 202 includes screen 204 showing an augmented reality view of environment 200. Specifically, screen 204 is showing a train station platform and the view of the train station platform has been augmented with a display of a visual representation of digital element 206 located at a physical location of the train station platform. A user may have discovered digital element 206 by moving device 202 around environment 200. As device 202 is moved around environment 200, display 204 displays a view of environment 200. The view of environment 200 may have been obtained from a camera of device 202 and/or a previously captured/generated visual image. Digital element 206 was placed at the physical location by a user. The same or different user may obtain digital element 206 by visiting the physical location and finding the device through a display of a device, as shown in FIG. 2. Digital element 206 is represented by a graphical "kiss" icon.

In order to obtain the digital element 206 displayed on screen 204, a user may perform a gesture with device 202. For example, a user may be required to swing device 202 in a semicircular motion to act out capturing digital element 206 displayed on screen 204. In some embodiments, when digital element 206 is obtained, a message associated with digital element 206 may be obtained. For example, digital element 206 represents a text message left for a user of device 202 by another user that has previously visited the physical location of digital element 206. In some embodiments, although a visual representation of a digital element can be seen on a display viewer screen, the digital element may not be able to be obtained until the device is closer to a location of the digital element. For example, as the device is moved closer to the location of the digital element, a visual representation of the digital element becomes larger. In some embodiments, when the digital element is able to be obtained, an indication is provided. For example, the visual representation may blink, move, wiggle, glow, pulsate, and/or change color to indicate that the element can be obtained. In some embodiments, device 202 may vibrate and/or emit a sound to indicate that the element can be obtained.

Figure 3:
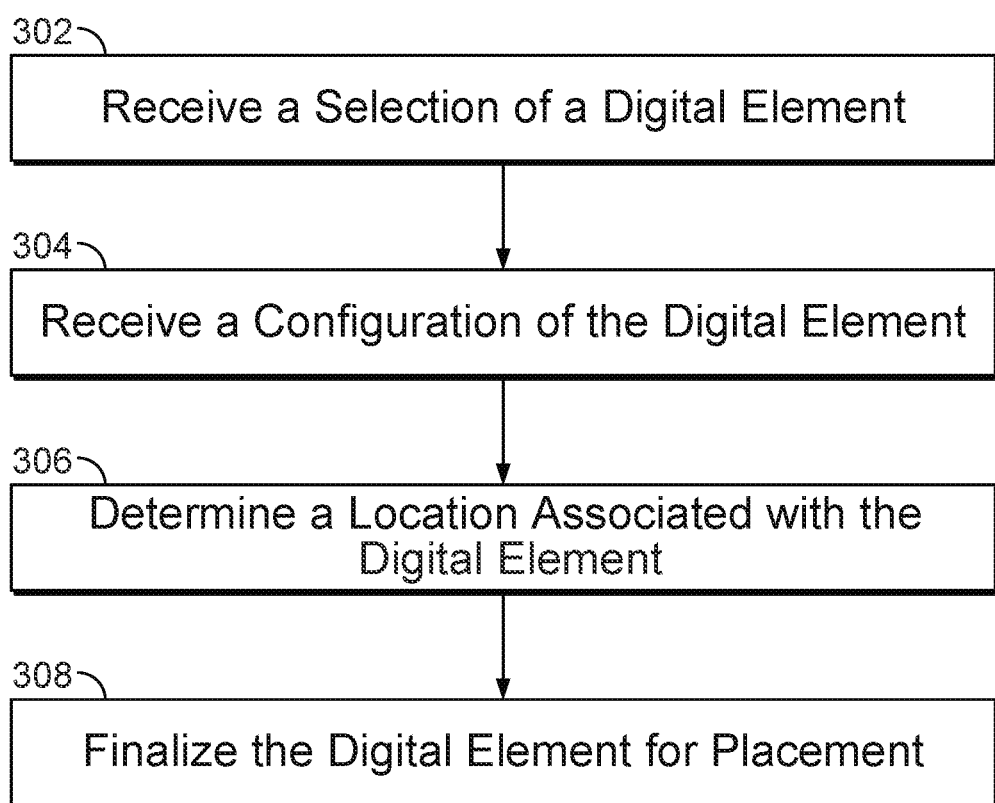
FIG. 3 is a flowchart illustrating an embodiment of a process for placing a digital element.

FIG. 3 is a flowchart illustrating an embodiment of a process for placing a digital element. The process of FIG. 3 may be implemented on device 102 and/or server 106 of FIG. 1. At 302, a selection of a digital element is received. In some embodiments, receiving the selection of the digital element includes receiving an indication of a digital element to be placed. Examples of the digital element include one or more of the following: a text, a message, an image, an audio, a video, a route, a user profile, contact information, a location identifier, a link, an icon, a coupon, a key, a geographical reference, a file, a promotion, an advertisement, a monetary object, and an interactive element. For example, a user may select to leave a message for another user. In another example, a user may select to leave a personal record to remember about a particular location. In another example, a user may select to leave a clue and/or a digital key that can be used to determine/access content in a scavenger hunt. In another example, a user may select to leave a coupon that can be redeemed to obtain a specified item from a merchant. In another example, a user may select to leave an interactive element that guides a receiver of the digital element to one or more locations (e.g., tour, on-screen guidance, an arrow, on-screen bird that a user can follow by physically moving to a location on a flight path of the on-screen bird, etc.). In various embodiments, a digital element may be utilized to provide one or more of the following: a guided tour, a game, a gift, record a memory, record an event at a physical location, a coupon, a promotion, an advertisement, an event, an educational experience, an exercise, a checkpoint, a waypoint, and a social experience.

In some embodiments, a user may select a type of digital content from a list of possible digital elements to place. In some embodiments, a user may generate a new type of digital element to place. In some embodiments, a type of digital element that can be left is determined based on one or more factors. For example, only certain type(s) of digital content may be placed at a particular location. Examples of the factors used to determine the type of digital content that can be left include one or more of the following: information obtained from one or more sensors of a user device (e.g., information from sensor 110 of FIG. 1), a status associated with a physical location, a time value, a temperature, a location where the digital content is to be placed, a user preference, a user account setting, a user privilege, a user status, information associated with a user placing the digital element, information associated with an intended recipient of the digital element, other digital elements at or near the physical location, information obtained from an Internet source, and information obtained from a server (e.g., information from server 106 of FIG. 1).

At 304, a configuration of the digital element is received. In some embodiments, the configuration includes a specification of a visual representation of the digital element to be placed. For example, an icon, a color, and a size to be used to represent the digital element may be received. In some embodiments, the configuration includes a specification of one or more configuration parameters specific to the type of digital content to be placed. For example, a text content of a message to be left is received. In another example, a file to be left is received. In another example, a specification of an item, a quantity, and a merchant of a redeemable coupon are received. In some embodiments, the configuration includes a specification of which user(s) may retrieve the digital content to be placed. In some embodiments, a user may specify that the digital content can be retrieved by everyone (i.e., public), only by the user placing the digital content (i.e., private), only by members belonging to one or more specified groups, or only by specified users. In some embodiments, the configuration includes one or more time parameters associated with the digital element. For example, a user may provide a time period when the digital content can be retrieved. In some embodiments, the configuration includes a specification of a restriction on the number of times the digital element can be retrieved. In some embodiments, the configuration includes a specification of how to notify potential receiver(s) of the digital element to be placed. For example, a user is able to send a notification (e.g., email, instant message, SMS, Twitter Tweet, Facebook posting, etc.) of the existence of the digital element to one or more users and configure whether an alert (e.g., vibration, sound, visual alert, other somatosensory alert, etc.) will be provided when a user who is able to retrieve the digital element is near the physical location of the digital element.

At 306, a location associated with the digital element is determined. In some embodiments, the location is at least in part determined to be a current physical location of a device being used to place the digital element. In some embodiments, at least a portion of the location of the digital element to be placed is automatically determined using one or more of the following associated with the device being used to place the digital element: GPS data, an Internet Protocol (IP) address, a Wifi positioning data, a cellular signal positioning data, a captured image (e.g., machine vision utilizing visual pattern matching to determine location), a captured audio, and a user provided location identifier. In some embodiments, the digital element is only allowed to be placed at the physical location of the device being used to place the digital element. In some embodiments, the digital element may be placed within a geographical boundary associated with the device being used to place the digital element. For example, the digital element may be placed within a specified distance from the location of the device. In some embodiments, the digital element may be placed in any location regardless of the device location. In some embodiments, the digital element may be placed at a location specified by a user. For example, a user may select a location from a map where the digital element is to be placed. In some embodiments, a user may specify a location within an environment view displayed on the device. For example, a user may select a location in an image captured by a camera on the device. In some embodiments, the location of the digital element includes a location point. In some embodiments, the location of the digital element includes a region. In some embodiments, the location associated with digital element is dynamically modified. For example, a region associated with the digital element becomes smaller and/or larger based at least in part on a time value, an elapsed time, a number of times the digital element has been obtained, and/or any other changing factor. In some embodiments, the location of the digital element includes a specification of one or more of the following: a latitude, a longitude, an elevation, a region shape, and a region.

In some embodiments, determining the location associated with the digital element includes receiving an identification that the digital element is to be associated with a predefined location of a recipient of the digital element. In some embodiments, a first user may predefine (e.g., using a map, GPS, etc.) one or more locations for the first user and another user indicates to place the digital element at one or more predefined locations of the first user. For example, a sender user places a message/photo for a recipient user at a predefined home location of the recipient user. In some embodiments, a user placing the digital element does not know the actual location of the predefined location of the recipient. For example, a sender indicates to place the digital element at a predefined location of the recipient based on a text description of the predefined location without having access to the exact location of the predefined location. In some embodiments, a sender indicates to send the digital element to the recipient and the digital element is automatically placed at a predetermined default location for the recipient. In some embodiments, a sender indicates which predefined location among a plurality of predefined locations to place the digital element.

In some embodiments, the location associated with the digital element is a location at and/or relative to a reference location of an object. For example, the digital element is placed at a relative location relative to the location of another digital object. In some embodiments, the location associated with the digital element is a location relative to a dynamic location that may change. For example, a user indicates to place the digital object at a location relative to a dynamic current location of an object/device (e.g., relative to current location of a reference device) and the current location of the reference device (e.g., device 120 of FIG. 1) may change as the object/device is moved. When a change in the location of the reference object/device is received/detected, the corresponding location of the digital element is updated. For example, a server receives location updates of a reference location device (e.g., data indicating current location of the device) periodically and/or dynamically when the location of the reference location device is changed. In some embodiments, a specified location relative to another dynamic reference location may include a distance, a direction, and/or a location coordinate offset relative to the dynamic reference location. For example, when a new dynamic reference location is detected, the corresponding location of a digital element is calculated by applying the offset to the reference location and the location of the digital element updated.

In some embodiments, the location associated with the digital element is the dynamic reference location. For example, the digital element is to be located at a location of a physical object (e.g., located at mobile device of a recipient) that can be dynamically moved in the physical world. The dynamic reference location may be dynamically determined based on a GPS, a beacon, Wifi, local area network signals, and/or cellular signals. In another example, the dynamic location may be dynamically specified/modified by a user. For example, the dynamic location is a location specified by a user rather than an automatically determined location. In some embodiments, a default relative location is utilized. For example, a user specifies to associate the digital element with a device and the digital element is placed at a default relative location relative to the dynamic current location of the device.

At 308, the digital element is finalized for placement. In some embodiments, finalizing the digital element includes associating the provided digital element with the determined location to enable one or more users to retrieve the digital element from the location. In some embodiments, finalizing the digital element for placement includes storing the digital element and/or metadata associated with the digital element in a storage such as storage 112 and/or 114 of FIG. 1. In some embodiments, finalizing the digital element for placement includes receiving at a server from a user device the digital element and/or metadata associated with the digital element. In some embodiments, finalizing the digital element for placement includes associating the digital element with one or more user accounts. For example, the digital element is associated with an identifier that identifies a user account of a user that created the digital element and one or more other identifiers identify user account(s) of one or more other users that are able to access the digital element.

FIGS. 4A-4E are diagrams illustrating an example user interface used to place a digital element. In some embodiments, FIGS. 4A-4E illustrate at least a portion of the process of FIG. 3.

Figure 4A:
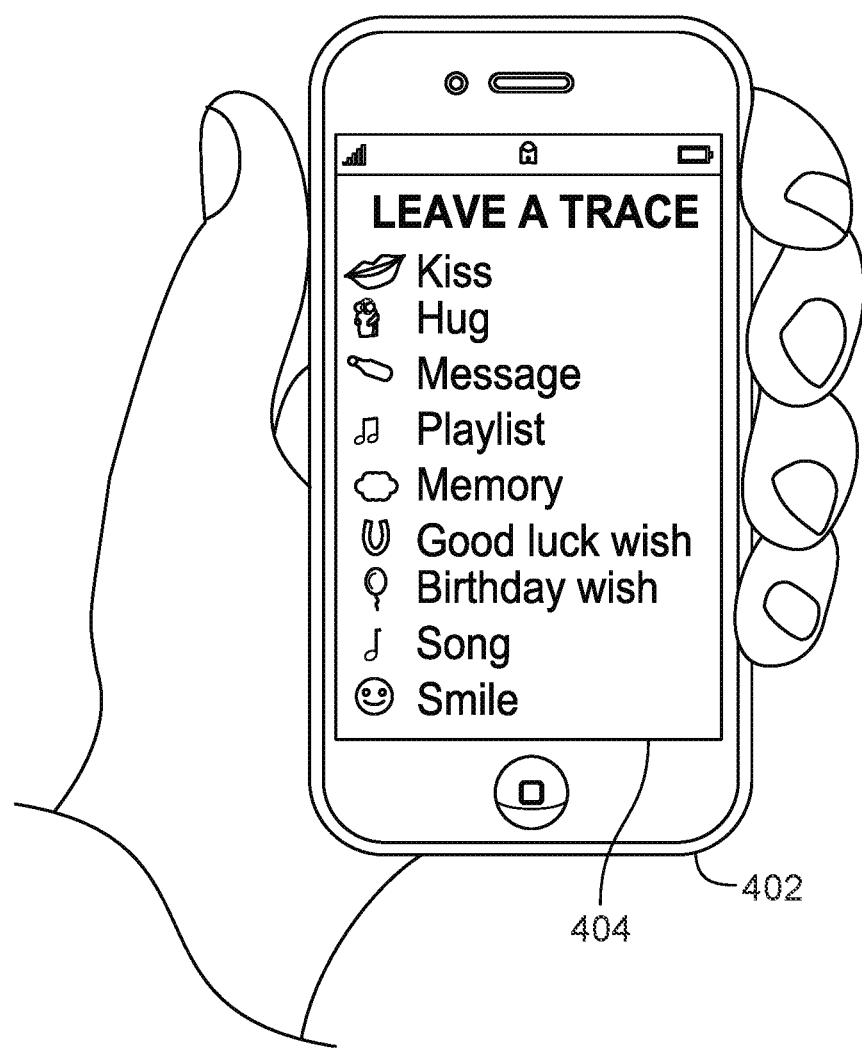
FIGS. 4A-4E are diagrams illustrating an example user interface used to place a digital element.

FIG. 4A shows a user holding device 402 that is running an application that can be used to place a digital element. In some embodiments, device 402 is device 102 of FIG. 1. Screen 404 is displaying a list of types of digital elements that can be placed.

Figure 4B:
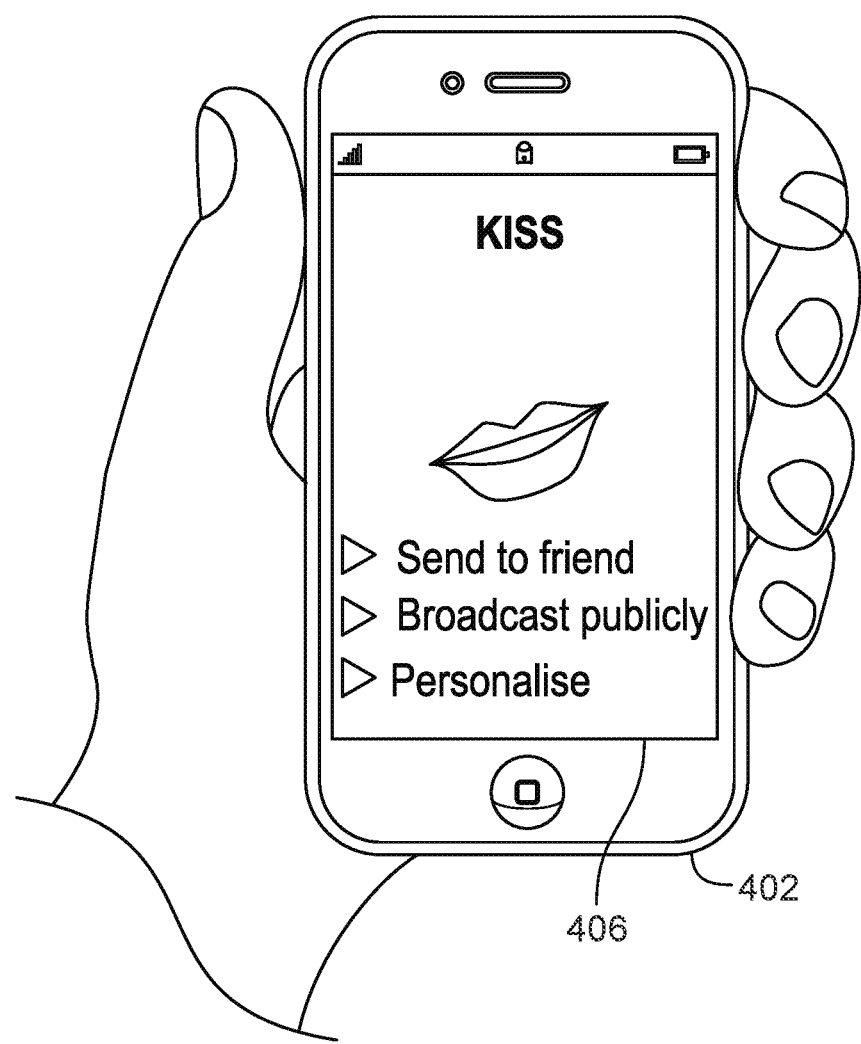

FIG. 4B shows screen 406 that is displaying a configuration screen after a "KISS" type of digital element has been selected by a user on screen 404 of FIG. 4A. The "KISS" type of digital element may be configured to be sent to one or more selected users by selecting the "Send to friend" option on screen 406. The "KISS" type of digital element may be configured to be publicly available to any user by selecting the "Broadcast publicly" option on screen 406. The "KISS" type of digital element may be personalized by selecting the "Personalise" option on screen 406.

Figure 4C:
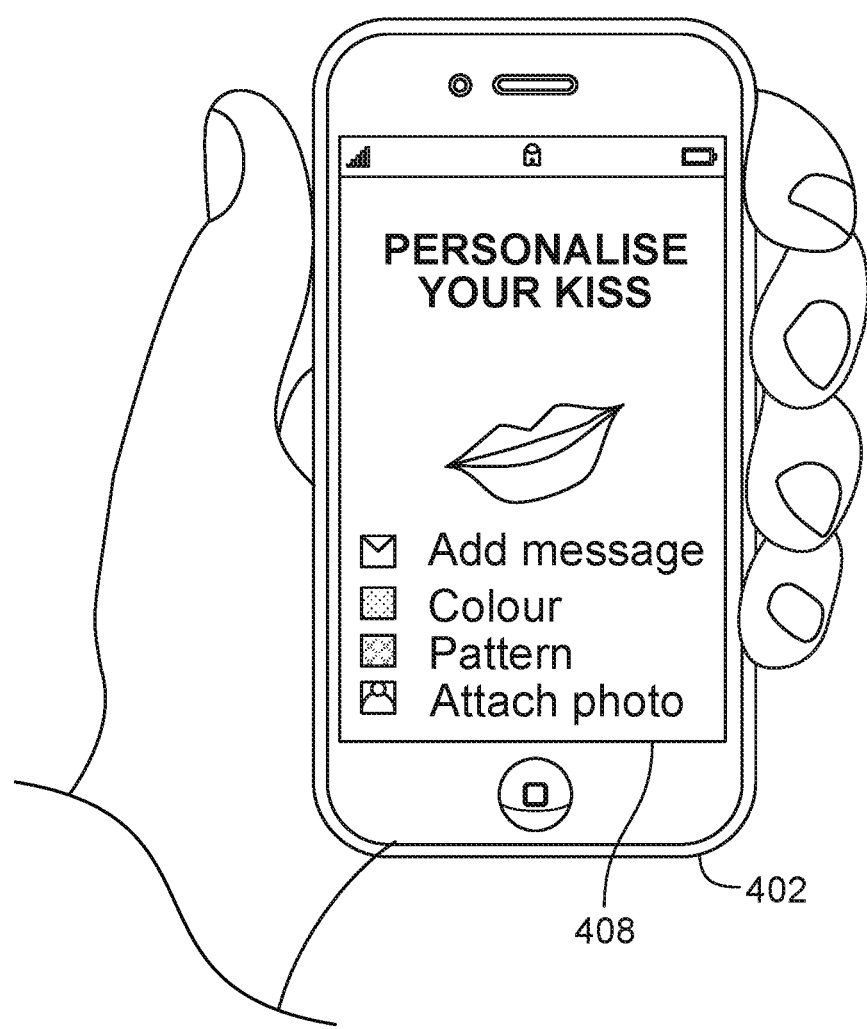

FIG. 4C shows screen 408 that is displaying personalization options after the "Personalise" option was selected on screen 406 of FIG. 4B. The "KISS" digital element may be personalized by adding a personal text message (e.g., by selecting the "Add message" option), changing the color of the visual representation of the digital element (e.g., by selecting the "Colour" option), changing the shading pattern of the visual representation of the digital element (e.g., by selecting the "Pattern" option), and a personal photograph may be attached to the "KISS" digital element (e.g., by selecting the "Attach photo" option).

Figure 4D:
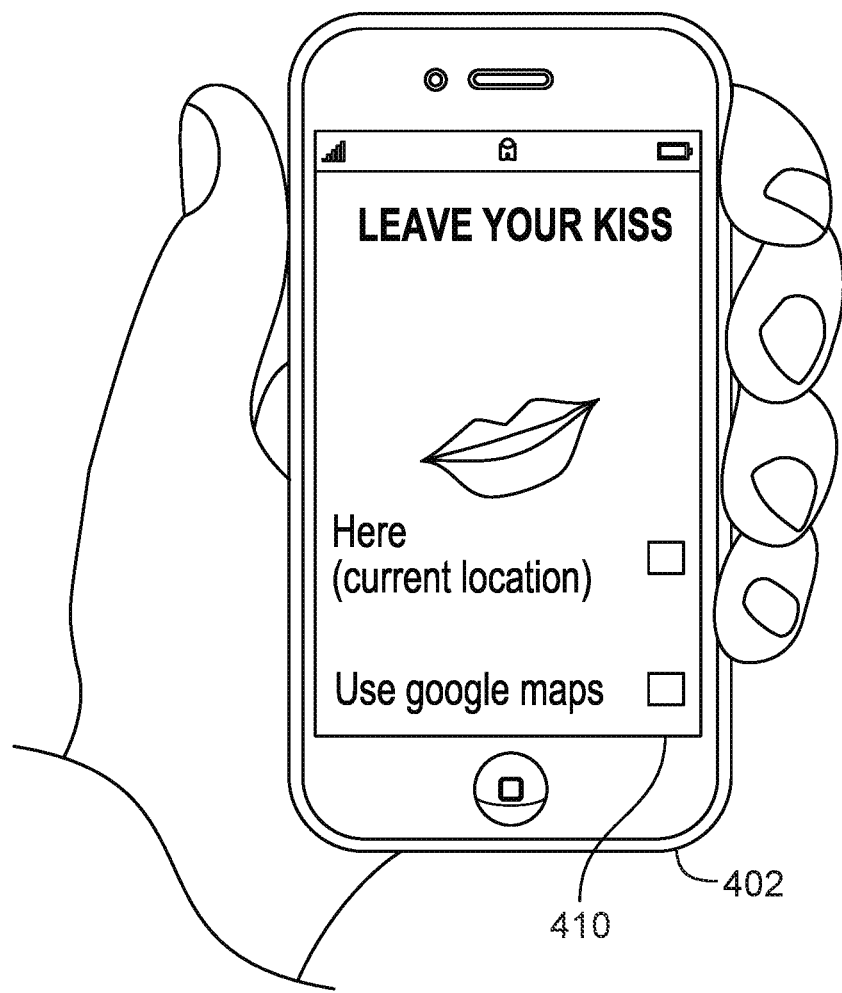

After the digital element has been configured and personalized, FIG. 4D shows screen 410 that is displaying options to determine a physical location associated with the digital element. By selecting the "Here" option, a geographical location of the device may be automatically determined (e.g., using GPS, Wifi, and/or Cellular signal location data) and associated with the digital element. By selecting the "Use google maps" option, a geographical location of the device may be provided by a user by selecting a location on a displayed map.

In some embodiments, a dynamic location option it provided. For example, an option "Follow this device" is provided and the location of the digital element is set to be dynamically updated to be based on the dynamically updated current location of a reference device (e.g., device 402). In one example, the digital element is set to be located at a current latitude and longitude of the reference device but its height/altitude component is set at a fixed distance (e.g., three feet above) relative to a current height/altitude of a recipient device utilized to view/obtain/capture the digital element. If the reference device is not the device utilized to specify the dynamic location of the digital element, an identifier of the reference device is able to be specified by the user placing the digital element.

Figure 4E:
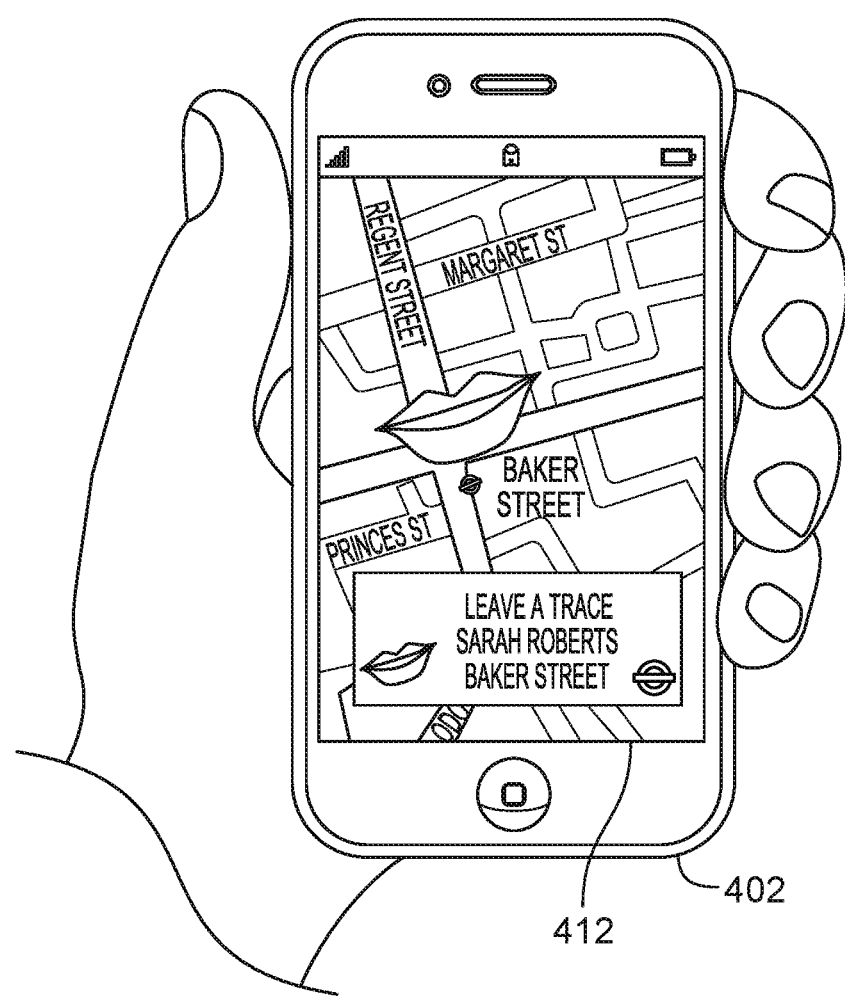

FIG. 4E shows screen 412 confirming the placement of the digital element after the location of the digital element has been determined. Screen 412 confirms that the "KISS" digital element has been placed at "Baker Street Station" by user "Sarah Roberts."

Figure 5:
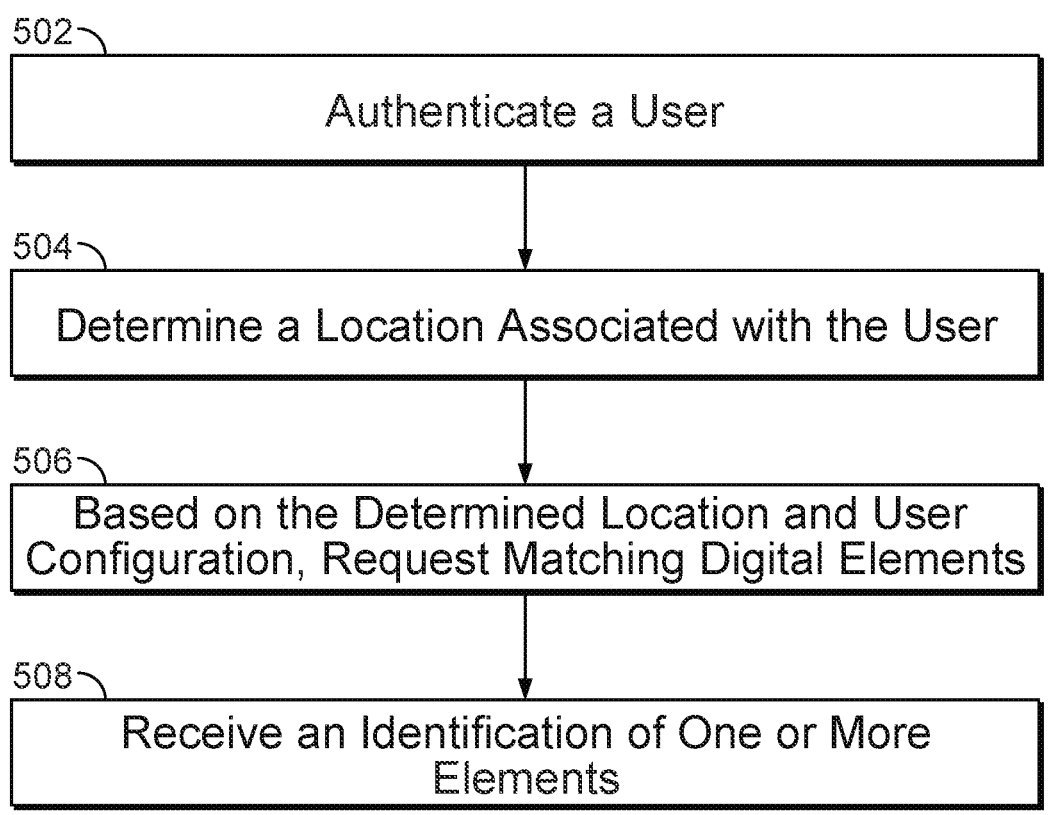
FIG. 5 is a flowchart illustrating an embodiment of a process for retrieving a digital element.

FIG. 5 is a flowchart illustrating an embodiment of a process for retrieving a digital element. In some embodiments, at least a portion of FIG. 5 is used to retrieve a digital element left using at least a portion of the process of FIG. 3. The process of FIG. 5 may be implemented on device 102 of FIG. 1.

At 502, a user is authenticated. In some embodiments, authenticating the user includes verifying a user account identifier and a password. For example, a user executes application 108 and provides a user identifier and a password to log into one or more services of server 106 of FIG. 1. In some embodiments, authenticating the user includes sending a user account identifier and password to a server and receiving verification that the user account has been authenticated. In some embodiments, the user account is associated with one or more preferences/configurations and the preferences/configurations associated with the authenticated user are obtained from a storage such as storage 112 and/or storage 114 of FIG. 1. For example, the user account is associated with a user configuration of desired digital elements (e.g., desired digital elements to be notified when physically near the digital elements), allowed digital elements (e.g., digital elements allowed to be obtained by the user of the user account), and/or one or more other associated users (e.g., user has access to one or more digital elements placed by friend users or other allowed users). In some embodiments, a user may subscribe to digital elements of another user. For example, a celebrity user may make the celebrity user's digital element public and allow a subscribing user access to the celebrity user's digital elements and is notified of the celebrity user's digital elements.

At 504, a location associated with the user is determined. In some embodiments, determining the location includes determining a physical location of a device that is to be used to obtain a digital element. For example, determining the physical location includes determining the physical location of device 102 of FIG. 1. In some embodiments, determining the location includes automatically determining a location using one or more of the following: GPS data, an IP address, a Wi-Fi positioning data, a cellular signal positioning data, a captured image (e.g., machine vision utilizing visual pattern matching to determine location), a captured audio, and a user provided location identifier. In some embodiments, a user may specify a location identifier. For example, a user may select a location from a map. In some embodiments, the location cannot be specified by a user and must be determined using detected information. In some embodiments, determining the location includes at least in part detecting a location and at least in part receiving a user provided location identification. For example, a general location is detected using one or more location sensors and a user is provided a plurality of possible locations within the general location for selection. In some embodiments, determining the location includes using information from sensor 110 of FIG. 1. In some embodiments, determining the location includes utilizing a location service provided by an operating system. For example, an operating system of device 102 of FIG. 1 provides a location identifier determined using one or more sensors of device 102. The provided location may be already processed to minimize errors of the location. For example, the operating system may provide a location that has been already processed using dead reckoning. Despite this and other processing, the provided location may be unstable and fluctuate due to detection errors. In some embodiments, determining the location associated with the user includes averaging a predetermined number of last consecutively detected/received location identifiers (e.g., average last five location coordinates received at a periodic interval from a location service).

At 506, based on the determined location and user configuration, matching digital elements are requested. In some embodiments, using the user configuration associated with the authenticated user in 502 and location determined in 504, a request is made to obtain a list of digital elements that match a desired criteria. For example, the user configuration includes an identification of one or more types, users, distance values, and/or other filters/preferences associated with digital elements desired by a user. In one example, digital elements that have been specifically sent to a recipient user and associated with the determined location are requested. In another example, digital elements placed by one or more users that are socially connected to a recipient user and associated with the determined location are requested. In another example, digital elements placed by one or more users that are followed/subscribed by a recipient user and associated with the determined location are requested. The determined location may be used to identify relevant digital elements that are near the determined location (e.g., within a predetermined, user configured, and/or dynamically determined distance from the determined location). The location of a digital element may be a dynamically updated location and the dynamically updated location is utilized in determining whether the digital element is near the determined location. In some embodiments, requesting the matching digital elements includes sending the request to a server such as server 106 of FIG. 1. In some embodiments, requesting the matching digital elements includes obtaining a list of matching digital elements from a storage such as storage 112 and/or storage 114 of FIG. 1. In some embodiments, matching digital elements are requested based on the determined location and a user identifier. For example, any digital element within a predetermined, configured, and/or dynamically determined distance from the determined location that is allowed to be received by a user of the user identifier is requested.

At 508, an identification of one or more elements is received. In some embodiments, receiving the identification includes receiving a list of one or more elements that match a criteria. In some embodiments, the identification identifies digital elements that match information provided in 506. For example, the identification includes a list of obtainable digital elements that are located within a predetermined, configurable, and/or dynamically determined distance from the provided location. In some embodiments, the identification only identifies digital elements that are allowed to be obtained by an identified user. For example, a provided user identifier is used to obtain user account information and the user account information (e.g., user preferences, associated users, other/previous digital elements placed/obtained by the user, etc.) is used (e.g., by a server) to determine a list of digital elements allowed to be accessed by the user. In some embodiments, the identification identifies digital elements based at least in part on a status associated with a determined location and/or a digital element. For example, one or more elements may be obtained a predetermined amount of times and an element may have reached the predetermined limit. In another example, one or more elements may only be obtained at a specified time and the element(s) are identified in the identification if a current time matches the specified time. In another example, one or more elements may only be obtained at a specified weather condition (e.g., specified temperature, precipitation, etc.) and the element(s) are identified in the identification if a current weather of the determined location matches the specified weather condition.

In some embodiments, one or more elements may only be obtained by one or more allowed users and the element(s) are identified in the identification if a user is included in the allowed users. In some embodiments, the identification is received from a storage such as storage 112 and/or storage 114 of FIG. 1. In some embodiments, the identification is received from a server such as server 106 of FIG. 1. In some embodiments, the identification includes content of digital element(s) identified by the identification. In some embodiments, the identification includes metadata associated with the digital element(s) identified by the identification. Examples of the metadata include information about a digital element, a rule defining how and/or when a digital element can be obtained (e.g., time restriction associated with a digital element), information about a visual representation of a digital element (e.g., image/animation to be rendered to display a visual representation of a digital element in an augmented reality view), information about a sonic representation of a digital element (e.g., sound to be rendered to indicate a representation of a digital element in an augmented reality world), information about a somatic representation of a digital element (e.g., tactile/haptic feedback to be rendered to indicate a representation of a digital element in an augmented reality world), and information about a notification associated with a digital element (e.g., vibration, sound notification, or other somatosensory notification, if any, when near a digital element). In some embodiments, one or more digital elements identified in the received identification are selected using one or more user preferences. For example, a user may be only interested in a specified type of digital element. In another example, a user may be only interested in digital element(s) placed by a specific user. In some embodiments, the identification of one or more elements is periodically and/or dynamically received. For example, as a physical location of a device receiving the identification changes and/or as digital elements are updated, updated identification is received as updated and/or at a periodic interval.

In some embodiments, one or more digital elements identified in the identification are associated with a notification. For example, a user of a device may not be actively paying attention to the device and/or an application such as application 108 of FIG. 1 that can be used to obtain digital elements. When the device is physically located within a distance (e.g., a predetermined, configurable, and/or dynamically determined distance) from a location where a digital element identified in the identification is placed, a notification may be provided using the device to alert a user that a digital element of interest is located near the device. Examples of the notification include audio, tactile (e.g., vibration), visual, and other somatosensory notifications. In some embodiments, at least a portion of a configuration on whether and/or how to provide the notification for a particular digital element may be included in the identification received in 508. In some embodiments, at least a portion of a configuration on whether and/or how to provide the notification for a particular digital element may be obtained from a user preference and/or user account information.

In some embodiments, one or more of the received digital elements are associated with their corresponding dynamic location. For example, a location of the digital element is tied to a current location of a physical device (e.g., smartphone) that is able to be moved to a different location. For any received digital element associated with a dynamic location, an updated location of the digital element may be received periodically and/or dynamically (e.g., received when location has changed). In some embodiments, an evaluation of whether any new digital element matches the criteria for receiving the digital element is periodically and/or dynamically determined whether any update to a dynamic location of a digital element causes it to meet the criteria. Identifiers of any new digital element that matches the criteria is received. An update to a dynamic location of a digital element may cause it to no longer match the criteria.

Figure 6:
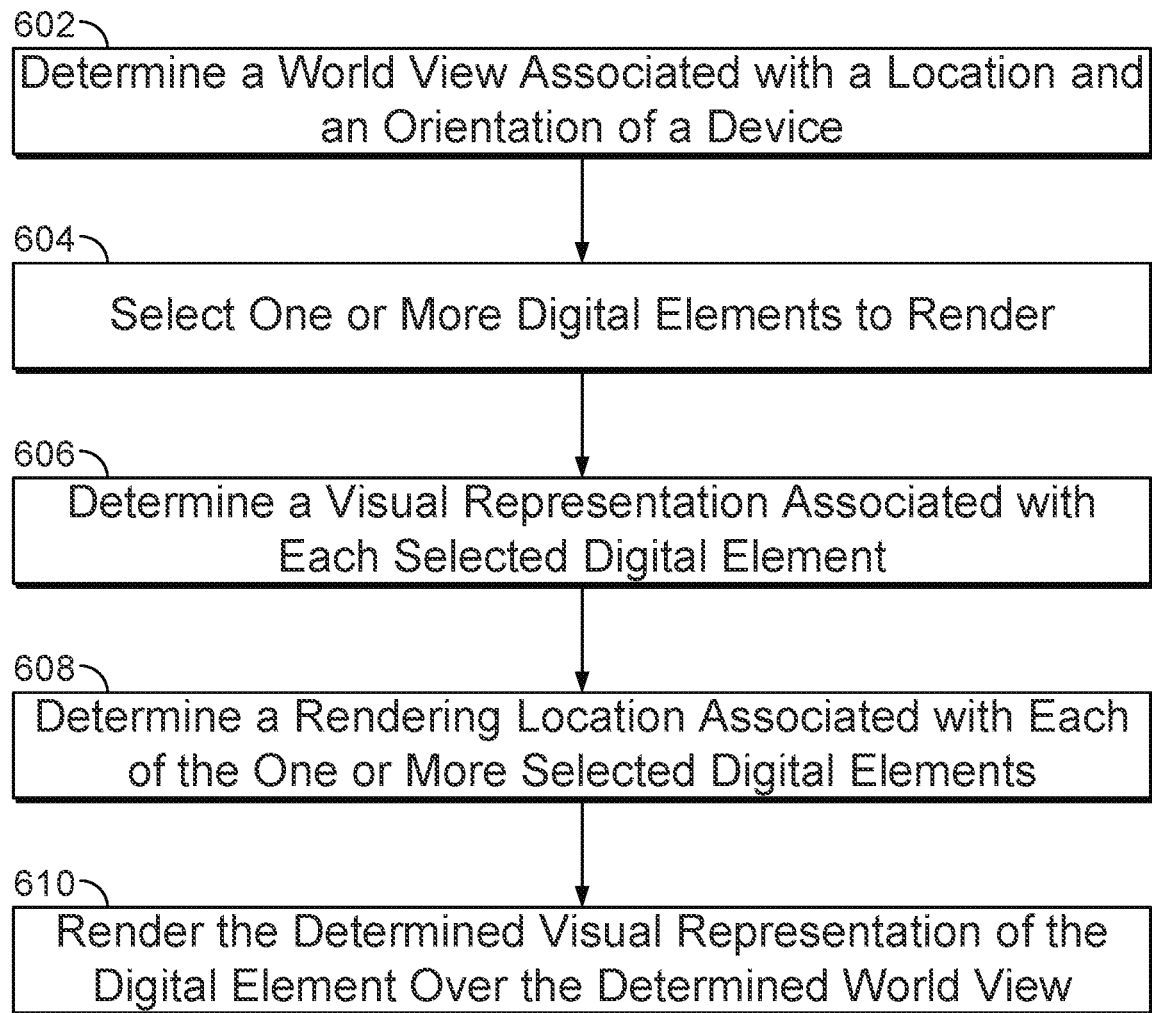
FIG. 6 is a flowchart illustrating an embodiment of a process for rendering a digital element.

FIG. 6 is a flowchart illustrating an embodiment of a process for rendering a digital element. In some embodiments, the process of FIG. 6 is at least in part included in step 508 of FIG. 5. The process of FIG. 6 may be at least in part implemented in device 102 of FIG. 1. In some embodiments, the process of FIG. 6 may be repeated at a periodic interval. In some embodiments, the process of FIG. 6 may be repeated dynamically (e.g., when location of a digital element is changed, when a location of a viewing device is changed, etc.).

At 602, a world view associated with a location and an orientation of a device is determined. In some embodiments, determining the world view includes determining an orientation of the device. For example, a user may navigate an augmented reality world by moving the device in the physical world and a corresponding view of the physical world captured by the camera of the device is augmented with visual, sonic and/or somatic representations of digital elements at appropriate locations and displayed on a screen of the device. In some embodiments, the world view is to be augmented to provide the augmented reality view with a rendered visual, sonic and/or somatic representation of a digital element. In some embodiments, an image captured by a camera (e.g., sensor 110 of FIG. 1) of the device is to be modified to include a visual representation of the digital element placed at a location depicted in the captured image. In some embodiments, rather than using images from a camera of the device to display the augmented reality world, determining the world view that includes obtaining a previously captured image and/or a virtual image may be utilized (e.g., an image matching a current location and orientation of the device).

The detected orientation of the device may be used to determine whether and where a digital element (e.g., placed using the process of FIG. 3) should be rendered on screen of the device. For example, by detecting the orientation and geographical location of the device, the environment being captured by a camera of the device and whether the digital element is located within the captured environment are determined. In some embodiments, determining the orientation of the device includes utilizing one or more sensors (e.g., sensor 110 of FIG. 1) of the device. For example, one or more of the following sensors are utilized to detect the orientation: an accelerometer, a compass, a gyroscope, and an orientation sensor.

In some embodiments, determining the orientation includes determining a horizontal heading/bearing pointed by the orientation of the device. For example, a compass directional bearing (e.g., numerical degree, compass direction, etc.) pointed by a camera of the device (e.g., pointing in the direction perpendicularly away from rear surface of device) in the plane of the earth horizon is determined. In some embodiments, the horizontal heading/bearing of the device is the center horizontal heading/bearing of a world view shown on a display of the device. For example, the horizontal heading/bearing of the device is the horizontal direction pointed by the center of the image captured by a camera of the device.

In some embodiments, determining the orientation includes determining a vertical heading/bearing pointed by the orientation of the device. For example, a vertical directional bearing (e.g., numerical degree, etc.) pointed by a camera of the device (e.g., pointing perpendicularly away from rear surface of device) in the plane perpendicular to the earth horizon is determined. In some embodiments, the vertical heading/bearing of the device is the center vertical heading/bearing of a world view shown on a display of the device. For example, the vertical heading/bearing of the device is the vertical direction pointed by the center of the image captured by a camera of the device. In some embodiments, determining the orientation includes determining a vertical tilt of the device.

At 604, one or more digital elements to render are selected. In some embodiments, selecting the digital elements includes receiving at least a portion of the identification received in 508 of FIG. 5. In some embodiments, the digital element to be rendered is associated with an augmented reality view to be displayed on a screen of a viewing device such as device 102 of FIG. 1. For example, an identification of digital element(s) physically located near the device was received in step 508 of FIG. 5 and stored in a storage such as storage 112 of FIG. 1. In some embodiments, only digital elements located within a specified distance from the viewing device are to be rendered. The specified distance may be preset and/or configurable. For example, using a slider, a user is able to adjust the distance value to increase or decrease the number of digital elements to be eligible to be rendered. A user may utilize the device to display an augmented reality view of the surrounding physical location, and if a digital element identified in the identification is physically located in the location to be displayed in the augmented reality view, the digital element is selected to be rendered. In some embodiments, selecting the digital element includes comparing a detected physical location and orientation of a viewing device with placement locations associated with identified digital elements and selecting one or more digital elements that are within the displayed augmented reality world view (e.g., located within a location depicted in an image captured with a camera of the device).

In some embodiments, one or more digital elements that are located within captured image view are selected from a group of eligible digital elements (e.g., elements received in 508 of FIG. 5) at least in part by using a determined heading/bearing of the device and a field of view of an augmented reality view to be displayed by the device. For example, for each digital element of the group of digital elements, a directional heading/bearing (e.g., horizontal and/or vertical heading/bearings) from a determined location of the device to the digital element is determined, and a digital element is selected to be rendered if a heading/bearing of the digital element is within a field of view range from a heading/bearing pointed by the device (e.g., determined in 602). In some embodiments, each digital element of the group of digital elements is associated with a vertical heading/bearing and/or a tilt in addition to a horizontal heading/bearing. For example, the digital element may be placed at a geographical location (e.g., placed using the process of FIG. 3) specified by a location coordinate that includes a latitude, longitude, and height/altitude components, and a horizontal and a vertical directional heading/bearing of the digital element are determined with respect to a detected location of the device (the digital element is selected to be rendered if the horizontal and vertical headings/bearings of the digital element are within a field of view range from the horizontal and vertical headings/bearings of the device). The height component of the location coordinate of the digital element may be defined as a fixed distance above a detected altitude of the device. For example, all digital elements are placed at a height three feet above a detected altitude of the device.

In another example, the digital element may be placed at a geographical location (e.g., placed using the process of FIG. 3) specified by a location coordinate that includes latitude, longitude, and tilt components (e.g., tilt angle of the device when digital element placed and/or standard tilt angle that is same across all digital elements, etc.), and a horizontal directional heading/bearing of the digital element is determined with respect to a detected location of the device to the location coordinate of the digital element (the digital element is selected to be rendered if the horizontal heading/bearing of the digital element is within a field of view range from a horizontal heading/bearing of the device and a tilt of the digital element is within a field of view range from a detected tilt of the device). The tilt component of the location coordinate of the digital element may be defined as a fixed tilt angle above a zero tilt angle of the device. For example, all digital elements are placed at a 45 degree tilt angle above a zero angle plane parallel to the horizon.

The field of view range may depend on specifications (e.g., angle of view range determined using lens focal length and sensor size) of a camera (e.g., included in sensor 110 of FIG. 1) of the device. In one example, a digital object is located at 160 degrees horizontal bearing direction from the device and the device is pointing towards 150 degrees in the horizontal bearing direction. In this example, the digital object is to be rendered because the camera of the device has a 30 degree horizontal angle of view, which means that the device is able to view +/−15 degrees (i.e., half of angle of view on each side) from the horizontal bearing direction (150 degrees) of the device, and the 160 degrees direction of the digital element is within this range (i.e., within 135-165 degrees range centered around horizontal bearing direction of the device). In the vertical direction, the digital object of the example is located at 50 degrees in the vertical bearing direction and the device is pointing towards 45 degrees in the vertical bearing direction, so the digital object is to be rendered because the camera of the device has a 40 degree vertical angle of view, which means that the device is able to view +/−20 degrees (i.e., half of angle of view on each side) from the 45 degrees vertical bearing direction of the device, and the 50 degrees bearing direction of the digital element is within this range (i.e., within 25-65 degrees range centered around vertical bearing direction of the device).

The field of view range may depend on specifications (e.g., angle of view range determined using lens focal length and sensor size of the camera) of a camera (e.g., sensor 110 of FIG. 1) that captured an image displayed as the augmented reality world environment. The field of view range may depend on the angle of view of an image displayed as the augmented reality world environment. As the viewing device is moved to navigate around the augmented reality environment, different digital elements within the view of the augmented reality environment may be displayed.

At 606, a visual representation associated with the selected digital element is determined. In some embodiments, determining the visual representation includes determining an image and/or animation to be displayed in an augmented reality world view to indicate a presence of a digital element at a location within the augmented reality world view. In some embodiments, at least a portion of the specification of the visual representation is included in the digital element selected in 604. In some embodiments, at least a portion of the specification of the visual representation is included in data received from a server, such as identification data received in step 508 of FIG. 5. The visual representation may include an image, an animation, an icon, a color specification, a size specification, and a notification to provide to indicate the digital element may be obtained. In some embodiments, determining the visual representation includes scaling and/or modifying (e.g., using visual perspective rules) an image/animation representation of the selected digital element based on a relative location of the digital element with respect to a distance and/or orientation of a device to render the visual representation. For example, for each digital element to be rendered, a distance between the digital element and the viewing device is determined and a rendering size of the digital element may be at least in part proportional (e.g., smaller if further away and larger if closer) to the distance. In some embodiments, if a digital element is selected to be rendered, a representation of the digital element may be scaled between a maximum size and a minimum size based on a distance between the digital element and a viewing device. In some embodiments, a numerical value indicating a distance value between the view device and the digital element is visually shown to the user (e.g., rendered next to visual representation of digital element).

In some embodiments, a sonic representation associated with the selected digital element is determined. In some embodiments, determining the sonic representation includes determining an audio to be produced in an augmented reality world to indicate a presence of a digital element at a location. In some embodiments, determining the sonic representation includes scaling and/or modifying an audio representation of the selected digital element based on a relative location of the digital element with respect to a distance and/or orientation of a device to render the audio representation. For example, a volume and/or tone of the audio representation may be increased as the digital element is located relatively closer to the device, and the volume and/or tone of the audio representation may be decreased as the digital element is located relatively further away from the device.

In some embodiments, a somatic representation associated with the selected digital element is determined. In some embodiments, determining the somatic representation includes determining a tactile/haptic feedback to be produced in an augmented reality world to indicate a presence of a digital element at a location. In some embodiments, determining the somatic representation includes scaling and/or modifying a tactile/haptic representation of the selected digital element based on a relative location of the digital element with respect to a distance and/or orientation of a device to render the somatic representation. For example, an intensity and/or pattern of the tactile/haptic representation may be increased as the digital element is located relatively closer to the device, and the intensity and/or pattern of the tactile/haptic representation may be decreased as the digital element is located relatively further away from the device.

At 608, a rendering location associated with each of the one or more selected digital elements is determined. In some embodiments, determining the rendering location of a selected digital element includes determining a screen placement location of the selected digital element within a displayed augmented reality world view. In some embodiments, each of the selected digital elements is associated with a horizontal heading and a vertical heading that have been determined based on a placement location of the element with respect to a detected location of a viewing device.

In order to place the selected visual representation of the digital element, a display displaying the augmented reality environment is divided/mapped/labeled into screen locations identified by horizontal and vertical heading coordinates (e.g., within horizontal and vertical field of view ranges of the device from a horizontal and vertical heading pointed by an orientation of the viewing device). For example, a horizontal heading and a vertical heading pointed by the orientation of the device are set as the center of the displayed augmented reality world view with reference to the perpendicular heading coordinate axis radiating out from the center in both the horizontal and vertical directions (e.g., respective ends of the axis at the edges of the displayed augmented reality world view correspond to ends of field of view range of the device). A selected representation of the digital element may be placed in this axis corresponding to its determined horizontal and vertical headings. In one example, a camera of a device with a 30 degree horizontal angle of view is pointing towards horizontal bearing direction of 150 degrees (i.e., the horizontal axis of the augmented reality world view is divided from 135 degrees to 165 degrees), and the camera has a 40 degree vertical angle of view and is pointing towards vertical bearing direction of 45 degrees (i.e., the vertical axis of the augmented reality world view is divided from 25 degrees to 65 degrees).

In some embodiments, a tilt angle/direction is utilized instead of the vertical heading when determining the placement location of the digital element. In some embodiments, the location associated with the digital element is dynamically modified. For example, a region associated with the digital element becomes smaller and/or larger based at least in part on a time value, an elapsed time, a number of times the digital element has been obtained, and/or any other changing factor. In another example, the digital element's placement location is changed due to movement of the digital element (e.g., due to dynamically updated location of a corresponding reference location device) and/or movement of the device used to explore the augmented reality world. In some embodiments, in order to stabilize a location of a digital element, the digital element's placement location is not modified due to change in detected location of the device.

At 610, the determined visual representation of the digital element is rendered over the determined world view. In some embodiments, rendering the visual representation includes superimposing the selected visual representation of the digital element (e.g., appropriately scaled/skewed following visual perspective rules based on a distance between a viewing device and digital element location) at the appropriate determined location on the determined world view corresponding to the location of the digital element (e.g., a selected representation of the digital element may be placed at its corresponding horizontal and vertical headings on a heading coordinate axis dividing/mapping/labeling locations on viewing device display). The created augmented reality view displays the digital element as being placed within the augmented reality world. As the device moves closer to the location of the digital element, the visual representation of the digital element may be scaled (e.g., to become larger) to follow visual perspective rules in creating an illusion that the user is approaching the digital element. The digital element may be animated to allow the digital element to move in the augmented reality world view. In some embodiments, the rendering of the digital element is associated with an audio, tactile and/or other somatosensory feedback. For example, an audio, tactile and/or other somatosensory feedback may be provided via the device to indicate the digital element.

In some embodiments, if a large number of visual representations of the digital elements are rendered close together (e.g., because they are all located in very close orientation from the viewing device), it may be difficult for a user to tell the digital elements apart and/or select a desired digital element. In some embodiments, when visual representations of the digital elements overlap, only the closest one to the view device may be eligible as selectable. In some embodiments, a user is able to zoom in and out (e.g., using pinch to zoom) of the world view and corresponding visual representations of the digital element are also made larger and smaller according to the zoom. This may enable a user to better distinguish and/or select a representation of a desired digital element among a cluster of visual representations of the digital elements. In some embodiments, a random noise factor is added to placement locations of clustered/overlapping visual representations to assist in visually separating the visual representations of the digital elements.

In some embodiments, a two-dimensional overhead view of locations of digital elements with respect to the viewing device is provided. For example, an overhead radar view is shown, where the center of the radar view represents the location of the viewing device and dots representing different digital elements surrounding the viewing device are mapped around the center with respect to the distance (e.g., further away digital element is shown further away from the center) and orientation (e.g., current horizontal orientation and field of view of the viewing device is indicated and respective directions of digital elements are shown) from the viewing device. The two-dimensional overhead view may be provided together with the augmented reality world view (e.g., radar view shown in a corner). In some embodiments, a user is able to switch between augmented reality world view and two-dimensional overhead view based on a tilt of the viewing device. For example, when a vertical tilt of the viewing device (e.g., detected using a tilt/gyroscope sensor) exceeds a threshold, the augmented reality world view is shown and when the vertical tilt of the viewing device is below the threshold, the overhead view is shown.

Figure 7:
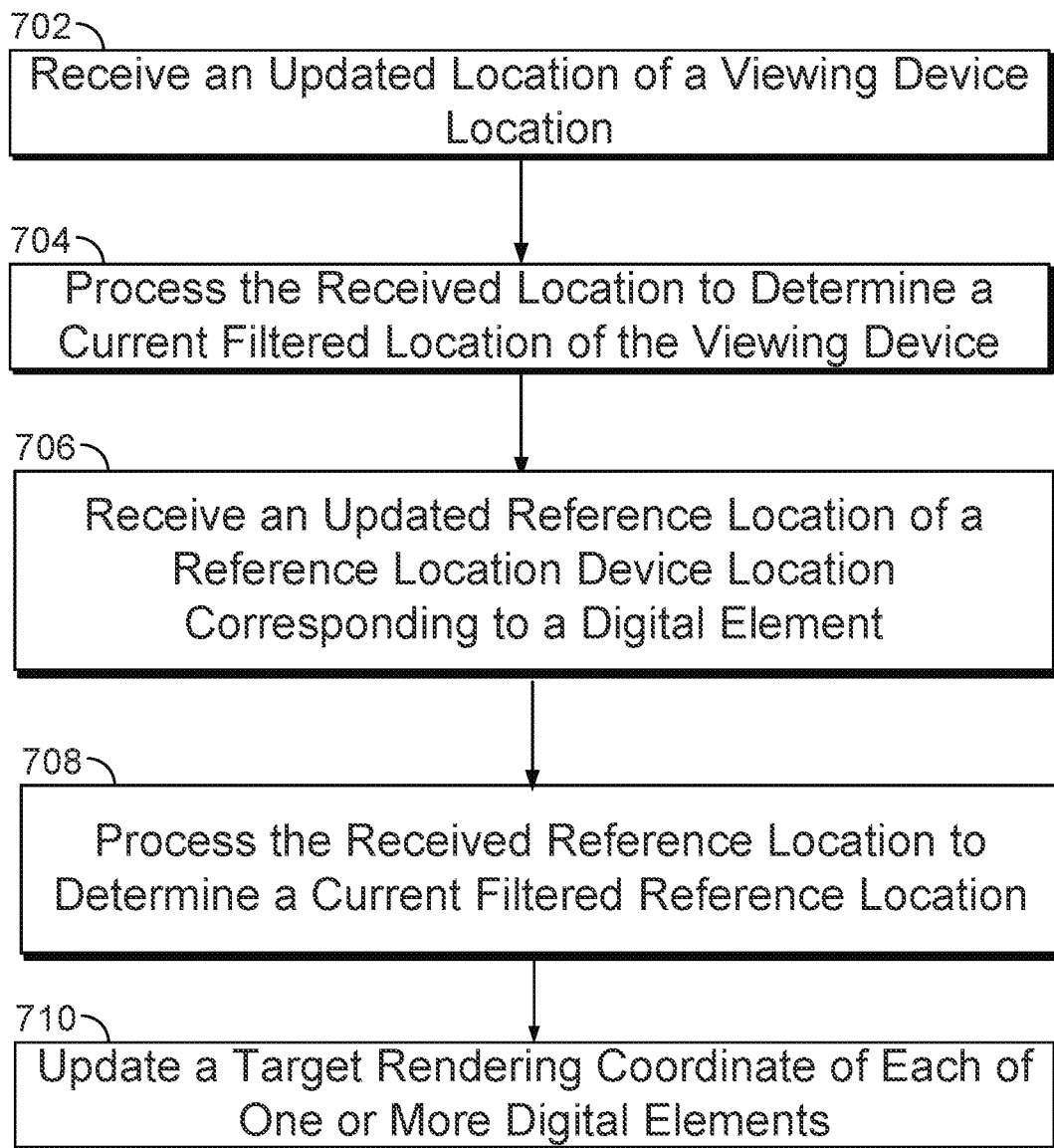
FIG. 7 is a flowchart illustrating an embodiment of a process for updating a target location of a digital element.

In some embodiments, a rendering size of a digital element is calculated using real distance between user position and location assigned to the digital element. Example pseudocode below outlines at least a portion of the steps performed to calculate the rendered size of a digital element.

define min and max digital element size (in pixels) relative to screen size;
      calculate distance;
      normalize distance to fit in our min/max range;
      calculate digital element size (pixels);
      transform pixel size to OpenGL screen size (rectangle (−1,−1), (1,1));

In some embodiments, a digital element horizontal position is calculated using compass readings and camera FOV (field of view defined in degrees). An example of this calculation is described by pseudocode below:

get compass true heading;
    define mix/max screen heading;
    min=heading−FOV/2−some margin;
    max=heading+FOV/2+some margin;
    calculate digital element bearing between user location and digital element location;
    if bearing is between our min/max range;
    calculate OpenGL screen position and mark object as valid to be rendered;
    apply low pass filter to make smooth transition between old and new position; else;
    mark as not valid to be rendered;

In some embodiments, a digital element vertical position is calculated using the gyroscope & accelerometer readings. An example of this calculation is described by pseudocode below:

define starting vertical position as half of the screen;
    get accelerometer data;
    calculate average reading from last n measurements;
    calculate vertical device tilt;
    add tilt value to starting position (this will move digital element up or down);
    apply low pass filter to smooth transition between old and new position;

An example pseudocode of rendering a frame of AR environment visualization is below:

set viewport size;
    set orthographic projection matrix;
    clear render buffer;
    bind program to draw camera feed;
    draw camera frame;
    bind program to draw bubbles;
    for digital element in group of digital elements;
    draw digital element;
    present render buffer;

FIG. 7 is a flowchart illustrating an embodiment of a process for updating a target location of a digital element. In some embodiments, the process of FIG. 7 is at least in part included in step 504 of FIG. 5. In some embodiments, the process of FIG. 7 triggers the process of FIG. 6. The process of FIG. 7 may be at least in part implemented in device 102 of FIG. 1. In some embodiments, the process of FIG. 7 may be repeated at a periodic interval. In some embodiments, the process of FIG. 7 may be repeated dynamically (e.g., when a new location of a viewing device is detected, etc.).

At 702, an updated location of a viewing device location is received. In some embodiments, receiving the updated location includes determining a physical location of a device that is to be used to explore an augmented reality environment that includes one or more digital elements. For example, determining the physical location includes determining the physical location of device 102 of FIG. 1. In some embodiments, receiving the location includes automatically determining a location using one or more of the following: GPS data, an IP address, Wi-Fi positioning data, local area network data, cellular signal positioning data, a captured image (e.g., machine vision utilizing visual pattern matching to determine location), a captured audio, and a user provided location identifier. In some embodiments, receiving the location includes receiving an updated location from a location service provided by an operating system. For example, an operating system of device 102 of FIG. 1 provides a location identifier determined using one or more sensors of device 102. The provided location may be already processed to minimize errors of the location. For example, the operating system may provide a location that has been already processed using dead reckoning. Despite this and other processing, the provided location may be unstable and will fluctuate due to detection errors. In some embodiments, the device is being used to display an augmented reality world view rendered in 610 of FIG. 6.

At 704, the received location is processed to determine a current filtered location of the viewing device. Because the received location may be unreliable and fluctuate due to detection errors, the received location may be filtered to determine a filtered location coordinate in attempting to smooth fluctuations of the locations. In some embodiments, a box filter is utilized to average the updated location with one or more other previously received updated locations. In some embodiments, the received updated location is averaged with a predetermined number of last consecutively detected/received location identifiers (e.g., average last five location coordinates received at a periodic interval from a location service) to determine the current filtered location. For example, each location coordinate component is averaged across a predetermined number of latest received location coordinates. In an alternative embodiment, the received location is not processed and the received location is set as the current filtered location.

In some embodiments, determining the current filtered location includes determining whether a difference between the received updated location of the device and a previously received location of the device differs by a threshold amount. For example, if the difference is at or below the threshold (e.g., threshold associated with a maximum rate of change), the received updated location is set as the current filtered location and if the difference is above the threshold, the received updated location may be averaged with another previously received location and/or modified so that the difference is at or below the threshold. In another example, if the difference is at or below the threshold (e.g., threshold associated with significant intentional device movement), the received updated location may be averaged with another previously received location, and if the difference is above the threshold, the received updated location is set as the current filtered location (e.g., no need to smooth because significant movement is due to device movement rather than location detection error). In some embodiments, the threshold is dynamically determined based at least in part on a type of the digital object, a size of a visual representation of the digital object, and/or a distance between a location of the digital object and the received updated location of the device.

At 706, an updated reference location of a reference location device corresponding to a digital element is received. In some embodiments, receiving the updated reference location includes receiving a physical location of a device that serves as a reference location for one or more dynamic locations of one or more digital elements. For example, determining the reference location includes determining the physical location of device 120 of FIG. 1. In some embodiments, use one or more of the following to receive the location that was automatically determined: GPS data, an IP address, Wi-Fi positioning data, local area network data, cellular signal positioning data, a captured image (e.g., machine vision utilizing visual pattern matching to determine location), a captured audio, and a user provided location identifier. The provided reference location may be already processed to minimize errors of the location. One example is the reference location that has been already processed using dead reckoning. Despite this and other processing, the provided reference location may be unstable and will fluctuate due to detection errors.

At 708, the received reference location is processed to determine a current filtered reference location for use in updating one or more locations of one or more corresponding digital elements. Because the received reference location may be unreliable and fluctuate due to detection errors, the received reference location may be filtered to determine a filtered location coordinate in attempting to smooth fluctuations of the reference locations. In some embodiments, a box filter is utilized to average the updated reference location with one or more other previously received updated reference locations. In some embodiments, the received updated reference location is averaged with a predetermined number of last consecutively detected/received reference location identifiers (e.g., average last five location coordinates received at a periodic interval from a location service) to determine the current filtered reference location. For example, each location coordinate component is averaged across a predetermined number of latest received location coordinates. In an alternative embodiment, the received reference location is not processed and the received location is set as the current filtered reference location.

In some embodiments, determining the current filtered reference location includes determining whether a difference between the received updated reference location of the reference location device and a previously received reference location of the reference location device differs by a threshold amount. For example, if the difference is at or below the threshold (e.g., threshold associated with a maximum rate of change), the received updated reference location is set as the current filtered reference location and if the difference is above the threshold, the received updated location may be averaged with another previously received location and/or modified so that the difference is at or below the threshold. In another example, if the difference is at or below the threshold (e.g., threshold associated with significant intentional device movement), the received updated reference location may be averaged with another previously received reference location, and if the difference is above the threshold, the received updated reference location is set as the current filtered reference location (e.g., no need to smooth because significant movement is due to device movement rather than location detection error). In some embodiments, the threshold is dynamically determined based at least in part on a type of the associated digital object/element, a size of a corresponding visual representation of the digital object/element, and/or a distance between a location of the corresponding digital object/element and the received updated reference location. The current filtered reference location is utilized to update locations of one or more digital objects/elements placed in association with the reference location device.

At 710, a target rendering coordinate of each of one or more digital elements is updated. In some embodiments, determining the target rendering coordinate includes determining a directional heading/bearing (e.g., horizontal and/or vertical headings) and a distance between an updated location of a digital element and the determined current filtered location. In some embodiments, the one or more digital elements are digital elements received at 508 of FIG. 5 and/or selected at 604 of FIG. 6. In some embodiments, the target rendering coordinate is a target goal rendering location where the digital element is to be placed. For example, the digital element is rendered at a current rendering location coordinate and the digital element is to be moved/animated towards the target rendering coordinate.

In some embodiments, determining the directional heading for each of the one or more digital elements includes determining a horizontal directional heading/bearing. For example, a compass directional bearing in the plane of the earth horizon (e.g., numerical degree, compass direction, etc.) from the current filtered location to the placement location (e.g., latitude/longitude) of the digital element (e.g., determined in 306 of FIG. 3) is determined. In some embodiments, determining the directional heading for each of the one or more digital elements includes determining a vertical heading/bearing pointed by the orientation of the device. For example, a vertical directional bearing (e.g., numerical degree, etc.) in the plane perpendicular to the earth horizon from the height/altitude of the filtered current location to the height/altitude location of the digital element is determined. The height/altitude of the filtered location may be an altitude of the device at least in part detected using a sensor (e.g., GPS) or a preset default reference height (e.g., set as reference height of zero). The height/altitude location of the digital element may be an altitude or tilt of the device at least in part detected using a sensor (e.g., detected at 306 of FIG. 3) or a predetermined reference height offset from the height/altitude of the filtered location (e.g., three feet above the height/altitude of the filtered location).

In an alternative embodiment, the target rendering coordinate of each of the one or more digital elements is not updated after it is initially determined. For example, in order to stabilize a rendering location of the digital elements, rendering locations of the digital elements are fixed until a new set of matching digital elements is requested (e.g., requested again at 506 of FIG. 5).

Figure 8:
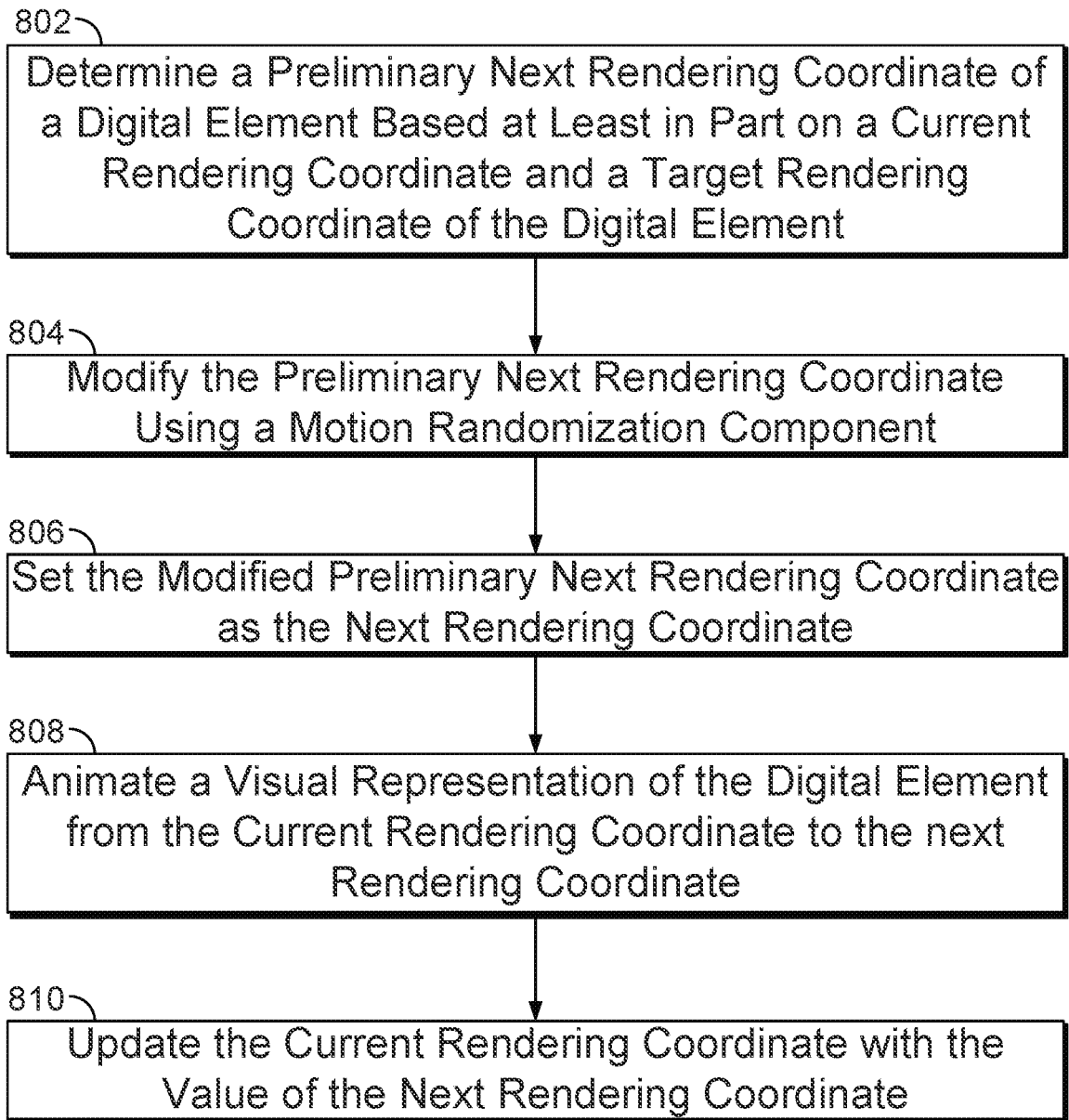
FIG. 8 is a flowchart illustrating an embodiment of a process for determining a next rendering location of a digital element.

FIG. 8 is a flowchart illustrating an embodiment of a process for determining a next rendering location of a digital element. In some embodiments, the process of FIG. 8 is at least in part included in step 610 of FIG. 6. In some embodiments, the process of FIG. 7 triggers the process of FIG. 8. The process of FIG. 8 may be at least in part implemented in device 102 of FIG. 1. In some embodiments, the process of FIG. 8 may be repeated at a periodic interval. In some embodiments, the process of FIG. 8 may be repeated dynamically (e.g., when a new target rendering coordinate is determined for a digital element, etc.).

At 802, a preliminary next rendering coordinate of a digital element is determined based at least in part on a current rendering coordinate and a target rendering coordinate of the digital element. In some embodiments, the target rendering coordinate of the digital element is the target rendering coordinate updated in 710 of FIG. 7 (e.g., updated due to movement of viewing device and/or movement of a reference location device of a dynamic location of a digital element). In some embodiments, the current rendering coordinate is associated with a location where a visual representation of the digital element is currently placed within an augmented reality environment. For example, the current rendering coordinate includes a directional heading/bearing (e.g., horizontal and/or vertical headings) and a distance between a location of the digital element and a current location of a viewing device that indicate a rendering location of a visual representation of the digital element.

In some embodiments, a visual representation of the digital element is to be eventually visually animated towards the target rendering coordinate. For example, the rendering coordinate of the digital element may be specified relative to a current location of a viewing device and if the current location of the viewing device changes (e.g., due to location sensor error and/or physical movement of the viewing device) and/or a dynamic location of a digital element changes (e.g., due to location sensor error and/or physical movement of the reference location device associated with the digital element), the rendering location of the digital element needs to be modified to reflect the movement of the viewing device location and/or digital element. However, sudden movement of a visual representation of the digital element to a new rendering location may seem unnatural to a user if the visual presentation jumps from one new location to another. Additionally, a digital element that unpredictably moves around at a fast speed may be difficult for a user to select/capture. Thus, by animating movement of the visual representation of the digital element from its old location to a new location in a controlled manner (e.g., travel speed limited), movement of the visual representation may appear natural and predicable to a user.

In some embodiments, determining the preliminary next rendering coordinate includes determining whether a difference between the current rendering coordinate and the target rendering coordinate differs beyond a threshold. For example, if the difference is at or below the threshold (e.g., threshold associated with a maximum rate of change, maximum coordinate value change, etc.), the preliminary next rendering coordinate is set as the target rendering coordinate and if the difference is above the threshold, the preliminary next rendering coordinate is set by modifying the current rendering coordinate up to the threshold for each component of the preliminary next rendering coordinate such that the preliminary next rendering coordinate is closest to the target rendering coordinate (e.g., preliminary next rendering coordinate is progressing towards the target rendering coordinate at a rate limited by a threshold maximum rate of change). In some embodiments, the target rendering coordinate is set as the preliminary next rendering coordinate regardless of the difference between the current rendering coordinate and the target rendering coordinate.

At 804, the preliminary next rendering coordinate is modified using a motion randomization component. For example, a visual representation of the digital element is desired to appear wavering/hovering (e.g., constantly moving slightly in random directions near the preliminary next rendering coordinate) even if the detected location of a viewing device has not changed. By constantly moving/animating the visual representation of the digital element within the augmented reality environment, a user is informed that the rendered location of the digital element within the augmented reality environment may fluctuate and is subject to change. Thus when the visual representation of the digital element is moved within the augmented reality environment (e.g., due to GPS error, viewing device movement, etc.), the user is not surprised that the visual representation is moving.

In some embodiments, modifying the preliminary next rendering coordinate includes modifying the preliminary next rendering coordinate by adding a Brownian motion component to the preliminary next rendering coordinate. In some embodiments, a directional component of the randomization component is added to a directional component of the preliminary next rendering coordinate. In some embodiments, a distance component of the randomization component is added to a distance component of the preliminary next rendering coordinate. In some embodiments, determining the motion randomization component includes utilizing the current rendering coordinate and the preliminary next rendering coordinate. For example, a random factor portion of a difference between the current rendering coordinate and the preliminary next rendering coordinate is utilized in determining the randomization component. In some embodiments, the randomization component is determined using a random number generator. In some embodiments, the randomization component is limited in magnitude. For example, the randomization component is proportional to the difference between the current rendering coordinate and the preliminary next rendering coordinate. The motion randomization component may also assist in being able to visual separate clustered/overlapping visual representations of digital elements.

At 806, the modified preliminary next rendering coordinate is set as the next rendering coordinate. For example, the resulting preliminary next rendering coordinate modified in 804 is set as the next rendering coordinate. In some embodiments, the next rendering coordinate identifies the next rendering location where a visual representation of the digital element is to be located. For example, the visual representation of the digital element is to be visually moved with movement animation from its current rendering coordinate to the next rendering coordinate. The next rendering coordinate may include a directional heading/bearing (e.g., horizontal and/or vertical headings) and a distance between a location of the next rendering coordinate and a current location of a viewing device.

At 808, a visual representation of the digital element is animated from the current rendering coordinate to the next rendering coordinate. In some embodiments, animating the visual representation includes visually moving the visual representation within an augmented reality environment. For example, the visual representation of the digital element is rendered over a determined world view (e.g., world view determined in 602 of FIG. 6) in successively different appropriate locations (e.g., appropriately scaled/skewed following visual perspective rules based on a distance between a viewing device and digital element location) on the determined world view corresponding to the travel path from the current rendering coordinate to the next rendering coordinate. In some embodiments, animating the visual representation using cubic interpolation and/or other interpolation-based animation to animate movement of the visual representation from the current rendering coordinate to the next rendering coordinate is used.

At 810, the current rendering coordinate is updated with the value of the next rendering coordinate. For example, because the visual representation of the digital element has been animated to the next rendering coordinate, the next rendering coordinate becomes the current rendering coordinate of the digital element. In some embodiments, the process of FIG. 8 returns to 802 and the process of FIG. 8 is repeated. For example, the process of FIG. 8 may be repeated at a periodic interval with each successive next rendering coordinate becoming the current rendering location. The target rendering coordinate of the digital element may be dynamically changing and each successive iteration of the process of FIG. 8 may use the updated target rendering coordinate.

Figure 9:
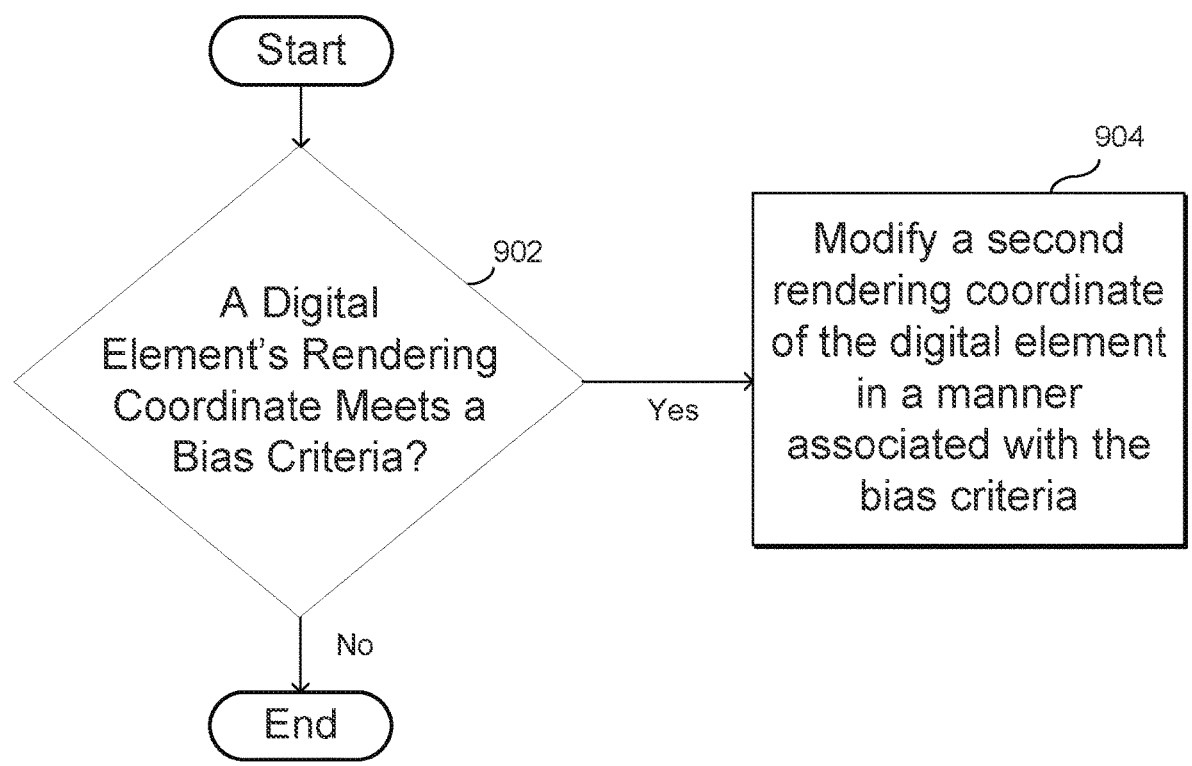
FIG. 9 is a flowchart illustrating an embodiment of a process for biasing a rendering coordinate of a digital element.

FIG. 9 is a flowchart illustrating an embodiment of a process for biasing a rendering coordinate of a digital element. In some embodiments, the process of FIG. 9 is at least in part included in step 610 of FIG. 6, 706 of FIG. 7 and/or 806 of FIG. 8. In some embodiments, the process of FIG. 9 triggers the process of FIG. 8 to be paused and/or not executed. The process of FIG. 9 may be at least in part implemented in device 102 of FIG. 1. In some embodiments, the process of FIG. 9 may be repeated at a periodic interval. In some embodiments, the process of FIG. 9 may be repeated dynamically (e.g., when an orientation/location of a viewing device is changed, etc.).

At 902, it is determined whether a digital element's rendering coordinate meets a bias criteria. In some embodiments, the digital element is the digital element rendered in 610 of FIG. 6. It may be desired to bias a rendering coordinate of the digital element to allow the digital element to be more easily selected by a user. For example, due to errors of determining an exact location of a viewing device, a visual representation of the digital element rendered using the rendering coordinate specified relative to a location of the viewing device may be moving within an augmented virtual reality environment. A user may select/capture the digital element to obtain additional digital content associated with the digital element by touching the visual representation displayed on a screen of the viewing device and/or orientating the view device such that a selection aim area (e.g., stationary crosshairs displayed on the center of the display screen of the view device) is placed over the digital element for at least a predetermined amount of time. However, if the visual representation is moving on the screen due to the fluctuations in the detected physical location of the view device, it may be difficult for the user to select the visual representation and/or orient the view device quickly enough to keep the moving visual representation within the selection aim area and/or touch the visual representation.

In some embodiments, determining whether the rendering coordinate meets the bias criteria includes determining whether the digital element has been indicated by a user. For example, it is determined whether a visual representation of the digital element has been indicated with a touch selection input on a touch input screen of a viewing device. In another example, it is determined whether a visual representation of the digital element is within a selection aim area of a display of the viewing device (e.g., determine whether a center of the visual representation is currently placed within a displayed outlined area where the associated digital element is captured after the visual representation is placed within the area for a predetermined amount of time).

In some embodiments, the rendering coordinate includes a directional component (e.g., a horizontal/vertical directional heading/bearing) and a distance component (e.g., distance between a location of the digital element and a current location of a viewing device). In some embodiments, determining whether the rendering coordinate meets the bias criteria includes determining whether a directional component of the rendering coordinate is within a determined range. For example, it is determined whether the heading of the rendering coordinate is within a threshold range (e.g., field of view range determined in 604 of FIG. 6) from a current heading of a viewing device (e.g., current heading determined in 602 of FIG. 6). By determining whether the heading of the rendering coordinate and the heading of the viewing device is within a threshold difference, it may be determined whether the viewing device is pointing towards (e.g., selecting aiming area is at the horizontal center of the screen of a viewing device) the rendering coordinate of the digital element. In another example, it is determined whether the visual representation of the digital element is being displayed on a screen of the viewing device by determining whether the directional component of the rendering coordinate is within the field of view of headings being displayed on the screen (e.g., headings included in field of view range determined in 604 of FIG. 6).

If at 902 it is determined that the digital element's rendering coordinate meets a bias criteria, at 904, a second rendering coordinate of the digital element is modified in a manner associated with the bias criteria. The second rendering coordinate may be the target rendering coordinate determined in 706 of FIG. 7 and/or the next rendering coordinate determined in 806 of FIG. 8.

In some embodiments, modifying the second rendering coordinate includes biasing a directional component of the next rendering coordinate using a detected current heading (e.g., detected at 602 of FIG. 6) of a viewing device. For example, it is desired for a visual representation of the digital element to remain within the directional headings viewable in the angle of view of the viewing device by biasing the second rendering location of the visual representation of the digital element to be moved towards the center of directional heading pointed by the viewing device. Biasing the directional component of the second rendering coordinate using the detected current heading may include setting the direction component of the second rendering coordinate as a weighted sum of the original direction component of the second rendering coordinate and the directional heading pointed by the viewing device.

In some embodiments, modifying the second rendering coordinate includes biasing a directional component of the second rendering coordinate using a directional heading associated with a selection aim area displayed on a viewing device. For example, it is desired for a visual representation of the digital element to remain within the selection aim area by biasing the second rendering location of the visual representation of the digital element to remain/move towards the center of selection aim area. Biasing the directional component of the second rendering coordinate using the directional heading associated with a selection aim area may include setting the direction component of the second rendering coordinate as a weighted sum of the original direction component of the second rendering coordinate and the current directional heading where the selection aim area is located.

In some embodiments, modifying the second rendering coordinate of the digital element includes not updating the second rendering coordinate of the digital element and allowing the digital element to remain in its current rendering location. For example, at 904, the next rendering coordinate in 806 of FIG. 8 is modified to be the current rendering coordinate rather than the modified preliminary next rendering coordinate. In another example, at 904, the process of FIG. 8 is paused/stopped until the digital element no longer meets the bias criteria. In another example, at 904, the target rendering coordinate in 706 of FIG. 7 is modified to be not updated in 706.

If at 902 it is determined that the digital element's rendering coordinate does not meet the bias criteria, the process ends. The process may return to 902. For example, the process of FIG. 9 may be repeated at a periodic interval and/or dynamically (e.g., when an orientation and/or location of a viewing device is updated).

Figure 10:
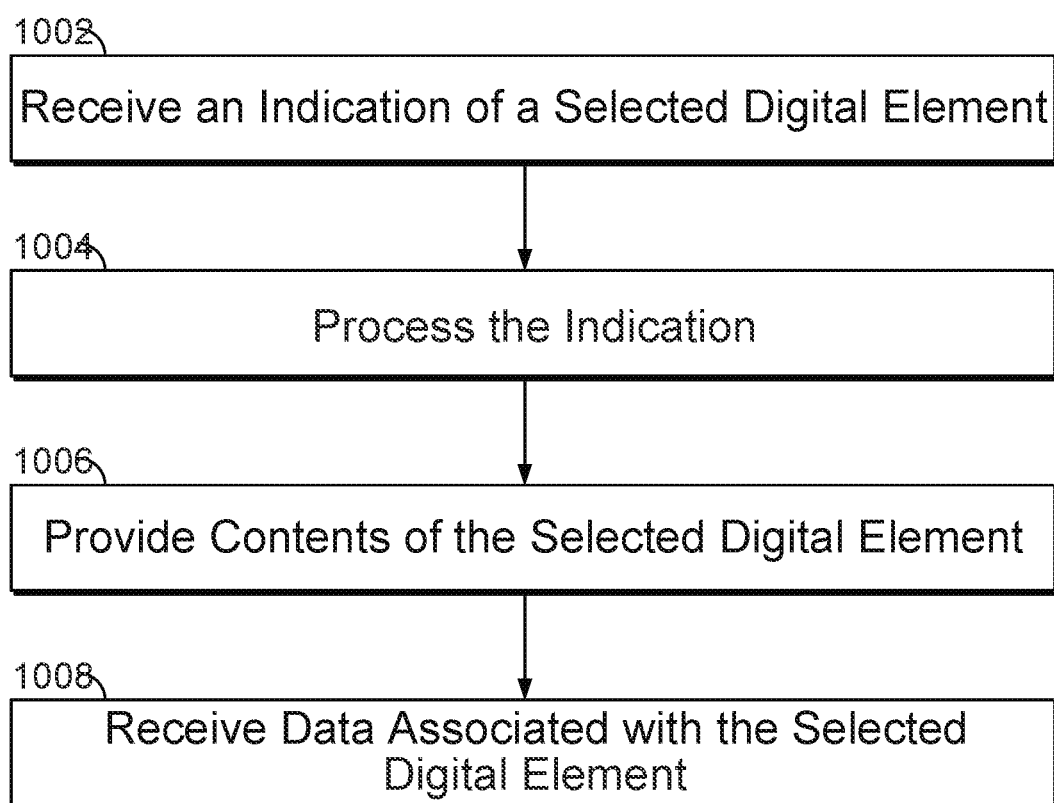
FIG. 10 is a flowchart illustrating an embodiment of a process for retrieving a rendered digital element.

FIG. 10 is a flowchart illustrating an embodiment of a process for retrieving a rendered digital element. The process of FIG. 10 may be at least in part implemented in device 102 and/or sever 106 of FIG. 1. In some embodiments, the process of FIG. 10 is used at least in part to obtain content of a digital element rendered in an augmented reality view. For example, the process of FIG. 6 is used to provide a rendered view of a digital element that may be obtained. In some embodiments, although a visual representation of a digital element can be seen on a display screen, the digital element may not be able to be obtained until the device is closer to a location of the digital element. For example, as the device is moved closer to the location of the digital element, a visual, sonic and/or somatic representation of the digital element becomes larger. In some embodiments, when the digital element is able to be obtained, an indication is provided. For example, the visual representation may blink, glow, pulsate, and/or change color to indicate that the element can be obtained. In some embodiments, the device may vibrate and/or emit a sound to indicate that the element can be obtained.

At 1002, an indication of a selected digital element is received. In some embodiments, a displayed digital element that is able to be obtained may be selected to be obtained by providing a gesture input. For example, a visual representation of a digital element that is displayed in an augmented reality view may be selected by a user to be obtained at least in part by touching the visual representation on a touch screen display. In some embodiments, a user may perform a movement/gesture (e.g., detected using an accelerometer, orientation sensor, compass, and/or gyroscope) with a device rendering the digital element to select a digital element to be obtained. For example, a user may be required to swing the device in a semicircular motion to act out capturing the rendered digital element. In another example, a user may be required to rub the visual representation of the desired digital element displayed on a touchscreen surface to act out scratching a scratch card to reveal the digital element contents.

In some embodiments, a user may capture a digital element by hovering over the digital object for a preset amount of time. For example a center of a display of a viewing device (e.g., device 102 of FIG. 1) displays a target selection area (e.g., cross hairs) and when the digital object is aimed in the target selection area for at least a predetermined amount of time, the digital object is indicated to be retrieved/captured. In some embodiments, a user may indicate to retrieve/capture a digital element by touching and/or holding (e.g., for a predetermined amount of time) the digital object on a touch input screen of the device. For example, a user may touch a rendered digital object on a display of a viewing device to retrieve/capture the digital object. In some embodiments, because the rendered location of the digital element may be unstable and change over time due to errors and limitations of using a sensor to detect the device location, it may be difficult to indicate a moving digital object. The process of FIG. 9 may be utilized to stabilize the digital element.

At 1004, the indication is processed. In some embodiments, processing the indication includes determining an identifier of the selected digital element. In some embodiments, processing the indication includes determining how and/or where to obtain contents of the selected digital element. In some embodiments, processing the digital element includes modifying and/or storing data associated with the digital element to indicate that the digital element has been retrieved by a specified user. In some embodiments, processing the digital element includes verifying that the selected digital element is allowed to be obtained by the user. In some embodiments, processing the indication includes obtaining contents of the selected digital element. In some embodiments, the contents may be obtained from a storage such as storage 112 and/or storage 114 of FIG. 1.

At 1006, contents of the selected digital element are provided. In some embodiments, providing the contents includes displaying text, image, video, and/or other content associated with the digital element. In some embodiments, providing the contents includes displaying the contents using the application used to render the visual representation of the selected digital element. In some embodiments, providing the contents includes opening the contents using a different application than the application used to render the visual representation of the selected digital element. For example, the contents include a spreadsheet file and the spreadsheet file is opened using a spreadsheet application.

At 1008, data associated with the selected digital element is received. In some embodiments, data such as utilization statistics, utilization behavior, and other utilization metrics associated with provided contents of the digital element and/or other data of the digital element is received at a server such as server 106 of FIG. 1. In some embodiments, the received data may be used to research utilization behavior. In some embodiments, the provided data is used to update configurations associated with the selected digital element. For example, the selected digital element can be accessed a limited number of times and the configuration that tracks the number of times the digital element has been accessed is updated using the received data.

Figure 11A:
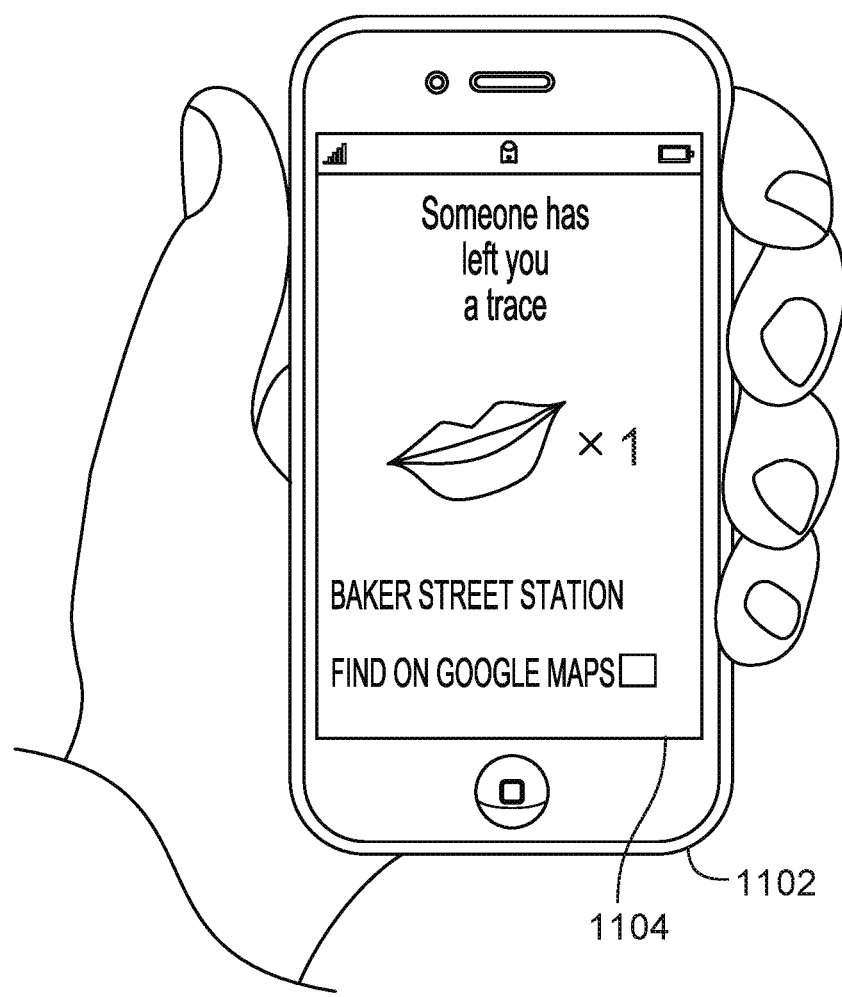
FIGS. 11A-11C are diagrams illustrating an example user interface used to retrieve a digital element.
Figure 11B:
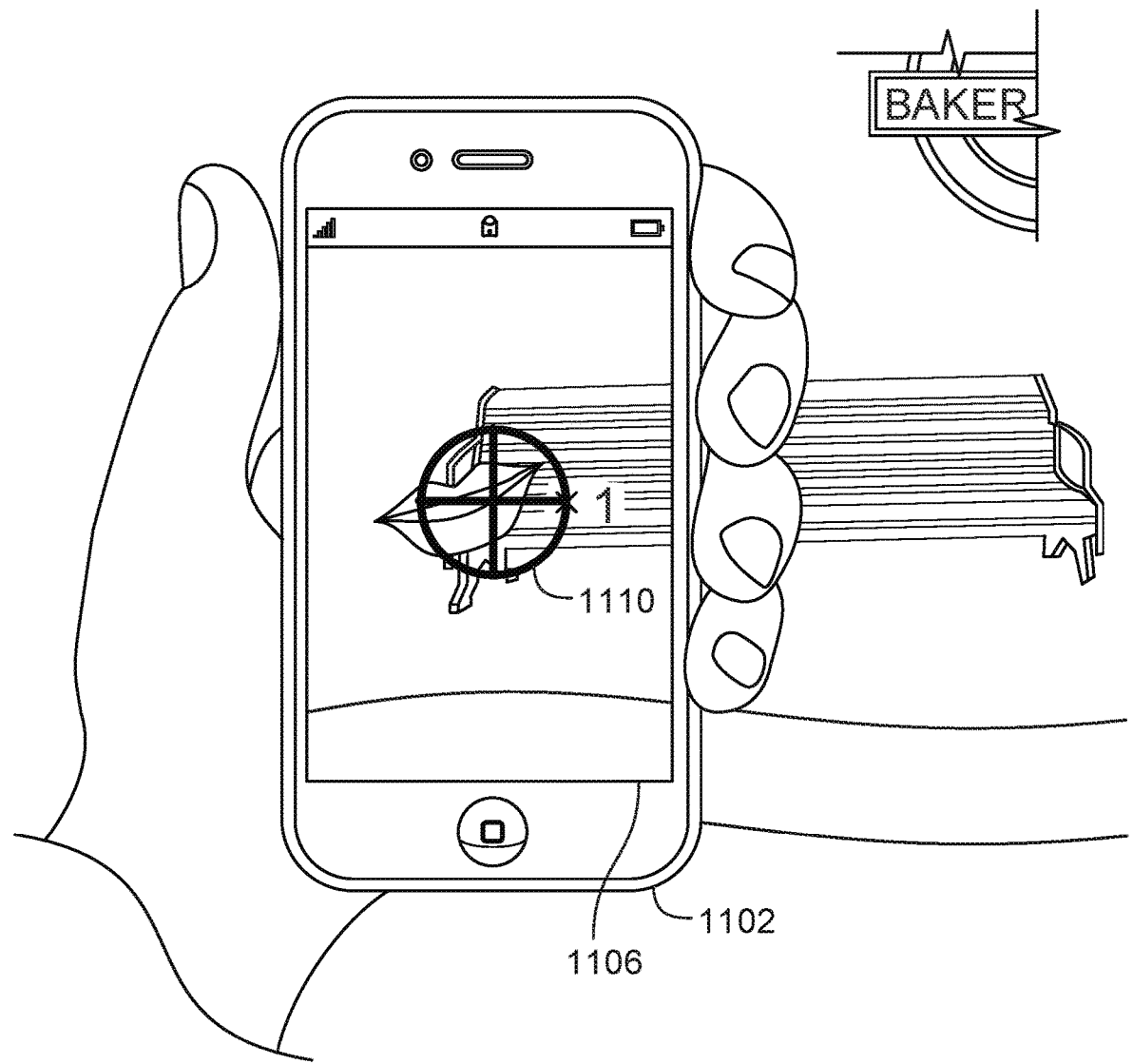
Figure 11C:
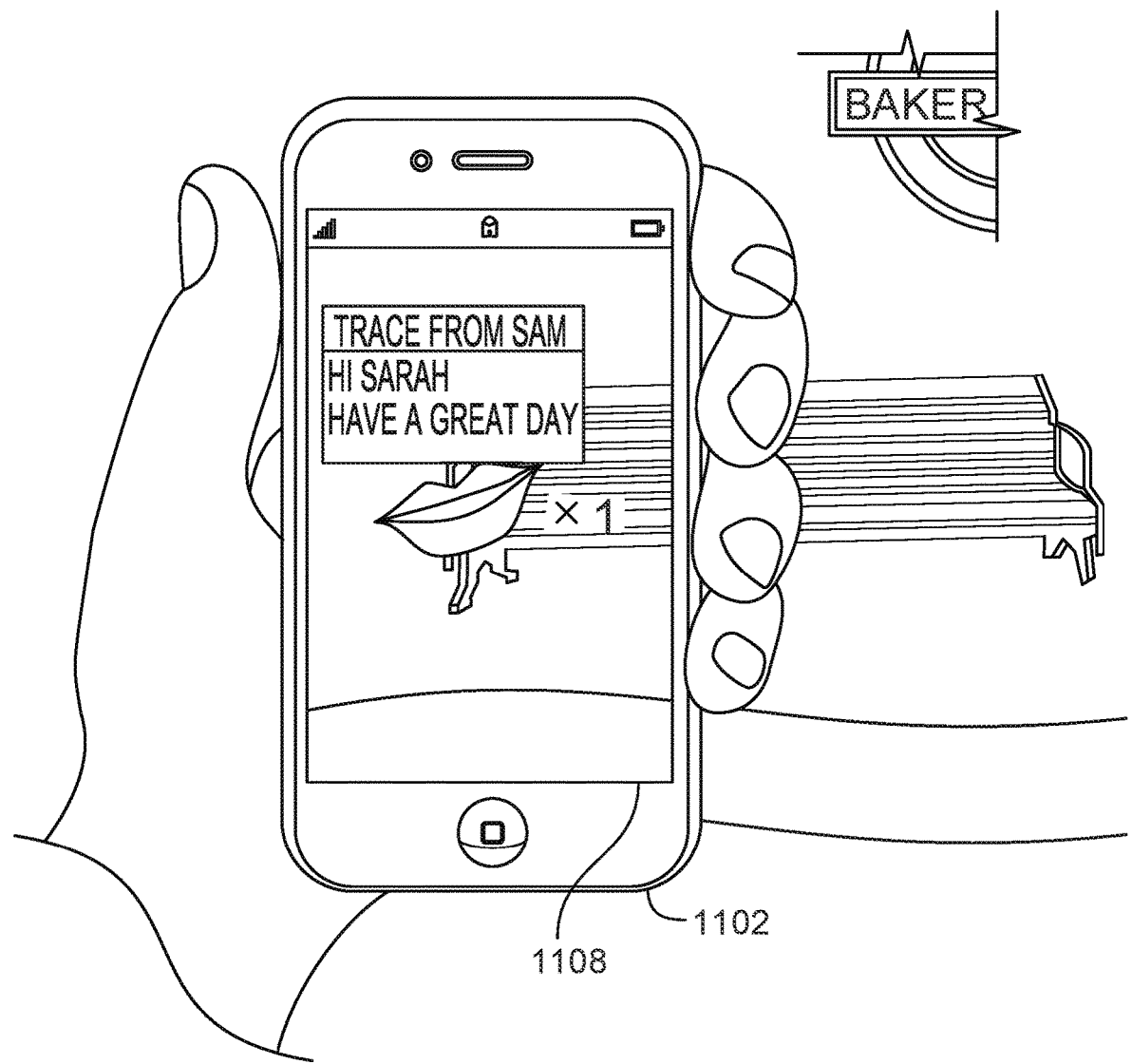

FIGS. 11A-11C are diagrams illustrating an example user interface used to retrieve a digital element. In some embodiments, FIGS. 11A-11C illustrate at least a portion of the processes of FIGS. 5-10. FIG. 11A shows a user holding device 1102 that is running an application that can be used to render and retrieve a digital element. In some embodiments, device 1102 is device 102 of FIG. 1. Screen 1104 is displaying a notification that another person has placed a "KISS" digital element (e.g., trace) at the "Baker Street Station" location for the user of device 1102. In some embodiments, the notification shown in screen 1104 is provided with an audio, tactile and/or other somatosensory notification. In some embodiments, the notification shown in screen 1104 was provided when the digital element was placed. In some embodiments, the notification shown in screen 1104 was provided when device 1102 was within a specified distance from the placement location of the digital element. FIG. 11B shows screen 1106 that is displaying an augmented reality view of the "Baker Street Station" location where the digital element was placed. In screen 1106, a visual representation of the digital element is rendered on top of a world view of the "Baker Street Station" location captured using a camera of device 1102. The "KISS" digital element may be indicated to be captured by the user by touching the digital element, touching the digital element for a predetermined amount of time, and/or aiming/placing the digital element within selection aim area 1110 for a predetermined amount of time. FIG. 11C shows screen 1108 that is displaying text message content of the digital element after a user of device 1102 has performed a gesture to indicate that the user desires to obtain contents of the displayed digital element.

In some embodiments, rather than and/or in addition to visually indicating a location of a digital element, auditory/sound cues are utilized to indicate a location (e.g., direction, distance, etc.) of the digital element. For example, the digital element is represented as emitting/reflecting a sound (e.g., music, pulse, tone, voice, sound/voice message, noise, sonar, etc.) and a user attempting to obtain the digital element is provided auditory clues on the relative location of the digital element with respect to a current location of the user. In some embodiments, binaural audio is utilized to indicate distance and/or directionality of a location of a digital element with respect to a user device location. For example, if a digital element is located left of a user device, a sound associated with the digital element is emitted stronger/sooner on the left audio output channel rather than the right audio output channel of the device. In some embodiments, a location (e.g., directionality) of a digital element with respect to a user/device is indicated using inter-aural time differences (e.g., time difference between left and right audio channels). In some embodiments, a location (e.g., distance) of a digital element with respect to a user/device is indicated using audio volume/intensity differences (e.g., sound of digital element rendered by the user device is louder as the user device is moved closer to the location of the digital object). In some embodiments, a location of a digital element with respect to a user/device is indicated using one or more head-related transfer functions (e.g., a response that characterizes how an ear receives a sound from a point in space).

FIGS. 12A-12D are diagrams illustrating example user interfaces used to interact with digital elements representing users. In some embodiments, FIGS. 12A-12D illustrate example interfaces that utilize digital elements discussed in the processes of FIGS. 3 and 5-10.

Figure 12A:
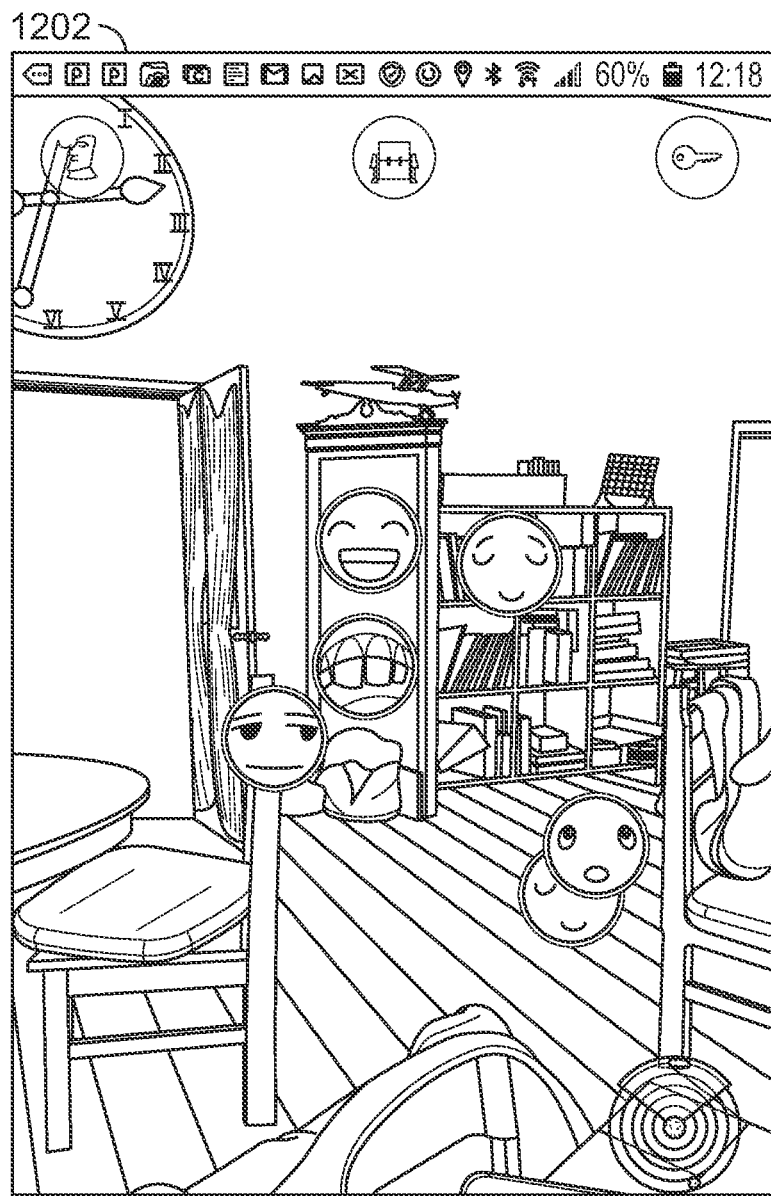
FIGS. 12A-12D are diagrams illustrating example user interfaces used to interact with digital elements representing users.

In some embodiments, users are able to discover and interact anonymously with other users who are physically close to them using the described processes herein. In some embodiments, users and their profiles are represented as visualized digital elements, floating as drops (or other visualizations in other embodiments) in an augmented reality/virtual environment as shown in FIG. 12A. In various other embodiments, users could also be represented as sound files or any other type of digital content. The digital element representing a user is associated with a dynamic location based on a device of the user. For example, the digital element is to be located at a location based on a current longitude and latitude of a smartphone device of the user. The smartphone device provides updates on its current location to a server that uses the current location updates to determine a location of the digital element representing the user. The server provides the updated locations of the digital element to other viewing devices that are located near the digital element. Using a combination of a mobile device camera, GPS coordinates, and a gyroscope, these drops are rendered by viewing devices in the real world in the approximate location of each user relative to others. Location data of a digital element is updated so that the location of a user's drop follows the user as the user moves in physical space with the reference location of the user. This allows augmented reality (AR) to represent the location of oneself and others.

A viewing/observing user may select (e.g., "catch") another user's drop digital element (e.g., by touching it in the AR camera view). Each drop digital element (i.e., user representation digital element) may represent a profile of a corresponding user represented by the drop digital element. For example, when the drop digital element is selected, information about the corresponding user (e.g., biographical information, contact information, a description of the user, interests of the user, photographs, video, user state, current user emotional state, etc.) is provided. In some embodiments, shops or brands are allowed to be users. In these cases, brands will be allowed to attach coupons, offers, URLs, advertising, cryptocurrency information, etc. to the profile associated with its drop digital element. In some embodiments, a single user may have multiple different identities represented by different drop digital elements. For example, one drop digital element is associated with a professional profile while another drop digital element is associated with a personal relationship profile. Which profile/drop digital element to represent a user may be dynamically changed based on a current location of the user and/or time.

A target user corresponding to a selected digital element is able to be friended or connected to the viewing/observing user as a contact. In some embodiments, the target user corresponding to the selected digital element must approve the connection request before being added as a contact of the viewing user. In some embodiments, once a drop digital element has been selected, the viewing user is able to add (or request to add) the corresponding target user of the drop digital element by swiping down on a visual element or indicate to not add the corresponding target user of the drop digital element by swiping down on the visual element. Once the target user has been added as an approved contact of the viewing user, the viewing user is provided the ability to interact with the target user. For example, users can send text, photos, and location information to each other. This information may be sent either privately (e.g., only the recipient can see it via messaging) or publicly (e.g., all users are able to see it via a public wall).

In some embodiments, each drop digital element may be associated with a chat history. For example, the chat history with a user is accessible via the drop digital element of the user. When a viewing user catches a drop digital element of a target user, in addition to the profile information of the target user, the viewing user is provided access to a history of interactions (e.g., text conversations, photos, locations, etc.) of all the other users that have posted publicly to that users public wall. A user is able to control privacy settings to specify which information or type of information is to be shared with which users or groups of users. In some embodiments, a target user may be added to a contact list of the viewing user based on a specified identifier of the target user rather than requiring the drop digital element of the target user to be captured in the AR view.

In some embodiments, in the augmented reality view of drop digital elements, a visual indication is provided to visually distinguish drop digital elements (e.g., add different color rings) that belong to the viewing user's contact list as compared to those that are not included in the viewing user's contact list. In some embodiments, a visual indication is provided to visually indicate which drop digital elements the viewing user has previously interacted with and which drop digital elements the viewing user has not previously interacted with. For example, drop digital elements that have never been selected by the viewing user previously are displayed inside a water droplet; drop digital elements that have been previously selected and stored in the viewing user's contacts are displayed with a halo surrounding their drop digital element; and drop digital elements that have been previously selected and rejected are displayed with no droplet surrounding them.

In addition to human users, objects, dogs, and other animals may by represented by a digital element. Users might tag a dog, cat, or even a car to be represented as a digital element (e.g., associated with a tracking reference location device). In some embodiments, drop digital elements have the ability to interact with each other independently of their associated users. They may be able to 'search' other digitally tagged locations for content/users and harvest information from their location. Drop digital elements will become a local, foraging search algorithm that adapts to the user's preferences.

Figure 12B:
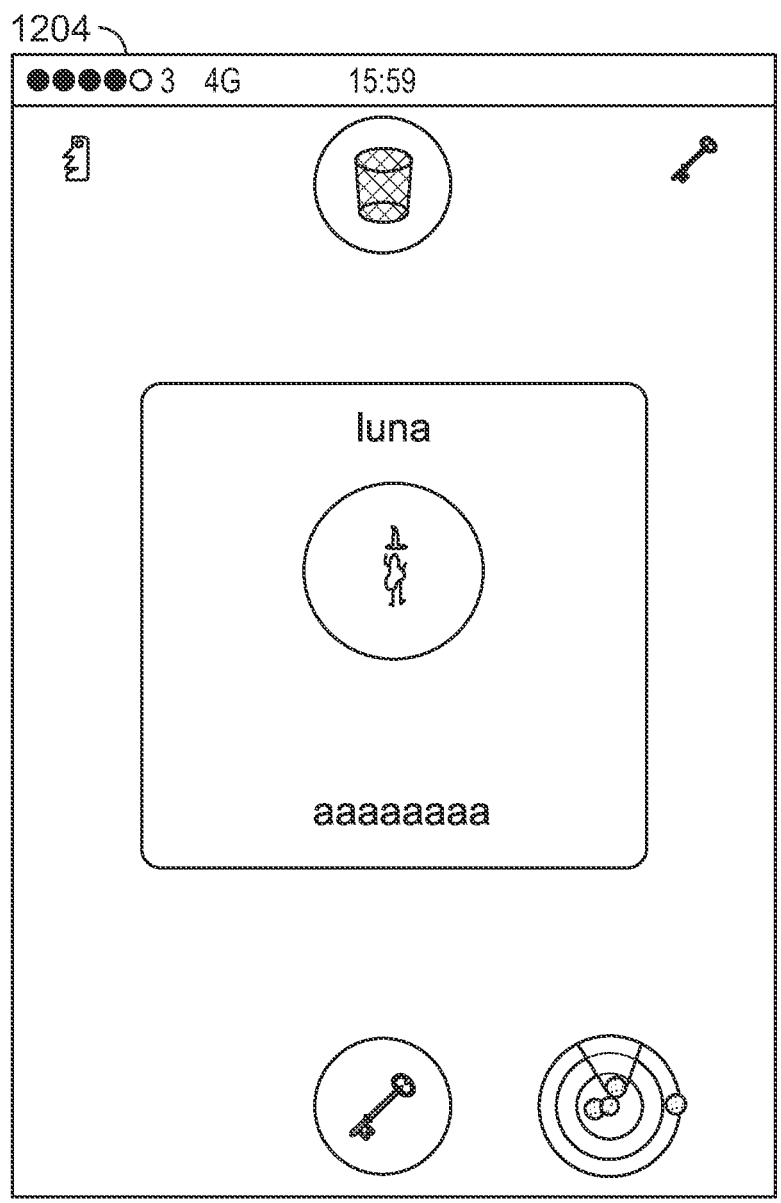
Figure 12C:
Figure 12D:
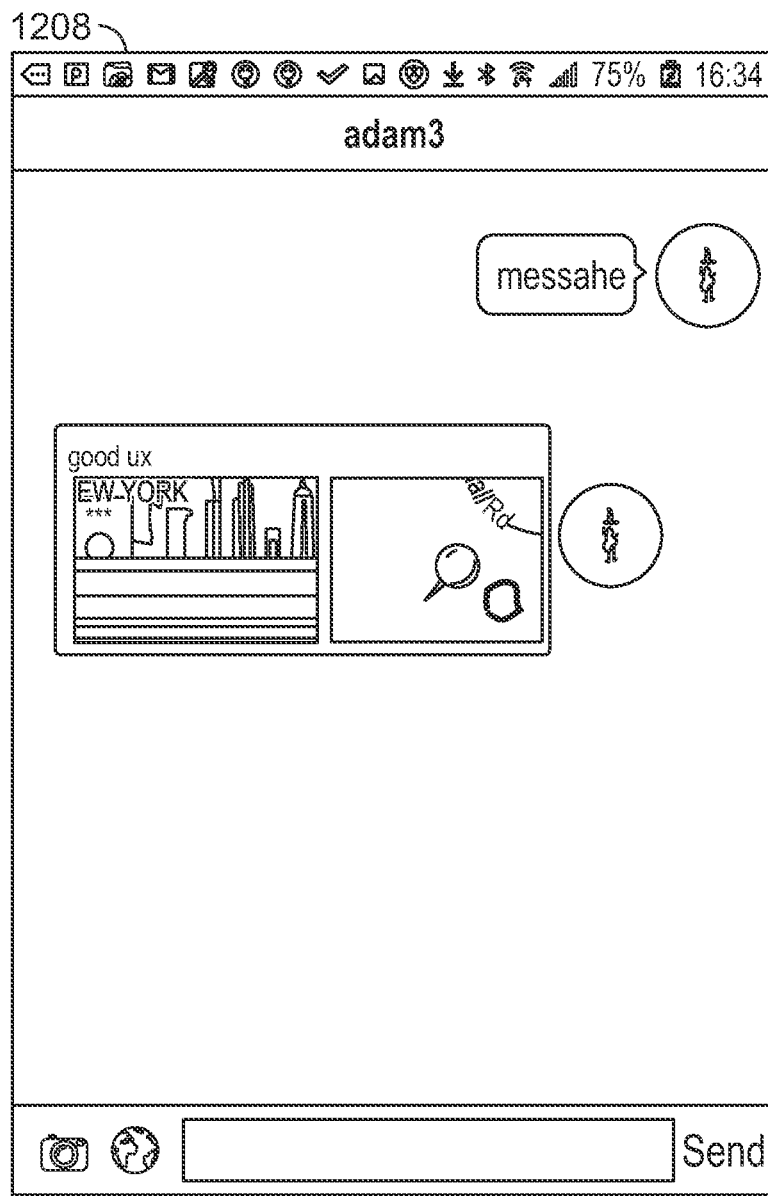

FIG. 12A shows example user interface 1202 visualizing drop digital elements floating in an augmented reality environment. The shown camera view is the "landing screen" allowing a user to interact with a drop digital element close by. The interface 1202 shows a halo around previously seen and connected/added (e.g., corresponding user added to contact list) drop digital elements. The halo is missing around the previously unseen/uncaught drop digital element. Bottom right corner shows a two-dimensional overhead view of a drop digital element near the viewing device of the viewing user. FIG. 12B shows example user interface 1204 visualizing profile information associated with a selected drip digital element that has been selected in an augmented reality environment. A user may choose to reject (e.g., by swiping up) or add (e.g., by swiping down) the user of the selected drop digital element to a contact list of the viewing user. If the user of the selected drop digital element is added to the contact list, the viewing user is taken to the added user's public wall. FIG. 12C shows example user interface 1206 showing a "public wall" of a user corresponding to a selected drop digital element. A viewing user is able to interact with the "public wall" by obtaining/posting text, media/photos, and/or location information. In some embodiments, private messages not on the "public wall" are able to be shared between users via the drop digital element. FIG. 12D shows example user interface 1208 showing private messages between users. As shown, a photo and location information have been shared privately between users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for rendering a digital element, comprising:
identifying the digital element located within a region near a device, wherein the digital element is virtually located at a dynamically updated location with real-world physical longitude and latitude components that dynamically change over time for the same digital element, but a vertical location of the digital element is specified relative to an augmented reality observing platform;
determining that the digital element is to be rendered;
obtaining a captured image of at least a portion of the region using a camera of the device;
using a processor to generate at the vertical location specified relative to the augmented reality observing platform, a representation of the digital element that has been found by a user but not yet captured by the user in a rendered augmented reality view provided via the augmented reality observing platform using at least a portion of the captured image obtained using the camera of the device; and
providing content of the digital element to the user in response to receiving an indication associated with a capture of the digital element by the user using the augmented reality view.

2. The method of claim 1, wherein the dynamically updated location of the digital element is based on a dynamic current location of a reference location device.

3. The method of claim 2, wherein the dynamic current location of the reference location device is provided to a server by the reference location device.

4. The method of claim 2, wherein the dynamically updated location of the digital element is determined based on an offset relative to the dynamic current location of the reference location device.

5. The method of claim 2, wherein the dynamically updated location of the digital element is updated to be at a latitude and longitude of the dynamic current location of the reference location device but the vertical location of the digital element is different from a vertical location component of the dynamic current location of the reference location device.

6. The method of claim 1, wherein generating the representation of the digital element in the augmented reality rendered view includes determining a filtered location of the augmented reality observing platform based at least in part on the dynamically updated location in a manner that reduces a rate of change of the dynamically updated location.

7. The method of claim 1, wherein generating the representation of the digital element in the rendered augmented reality view includes calculating a directional heading value of the digital element based at least in part on a determined geographical location of the augmented reality observing platform.

8. The method of claim 1, wherein the capture of the digital element using the augmented reality view is due to a user indication associated with the digital element.

9. The method of claim 1, wherein the digital element includes a user profile of a target user.

10. The method of claim 1, wherein providing the content of the digital element in response to receiving the indication associated with the capture of the digital element by the user includes awarding the content of the digital element to the user.

11. A system for rendering a digital element, comprising:
one or more processors configured to:
identify the digital element located within a region near a device, wherein the digital element is virtually located at a dynamically updated location with real-world physical longitude and latitude components that dynamically change over time for the same digital element, but a vertical location of the digital element is specified relative to an augmented reality observing platform;

determine that the digital element is to be rendered;

obtain a captured image of at least a portion of the region using a camera of the device;

generate at the vertical location specified relative to the augmented reality observing platform, a representation of the digital element that has been found by a user but not yet captured by the user in a rendered augmented reality view provided via the augmented reality observing platform using at least a portion of the captured image obtained using the camera of the device; and provide content of the digital element to the user in response to receiving an indication associated with a capture of the digital element by the user using the augmented reality view; and a memory coupled with at least one of the one or more processors, wherein the memory is configured to provide at least one of the one or more processors with instructions.

12. The system of claim 11, wherein the dynamically updated location of the digital element is based on a dynamic current location of a reference location device.

13. The system of claim 12, wherein the dynamic current location of the reference location device is provided to a server by the reference location device.

14. The system of claim 12, wherein the dynamically updated location of the digital element is determined based on an offset relative to the dynamic current location of the reference location device.

15. The system of claim 12, wherein the dynamically updated location of the digital element is updated to be at a latitude and longitude of the dynamic current location of the reference location device but the vertical location of the digital element is different from a vertical location component of the dynamic current location of the reference location device.

16. The system of claim 11, wherein the one or more processors are configured to generate the representation of the digital element in the augmented reality rendered view including by being configured to determine a filtered location of the augmented reality observing platform based at least in part on the dynamically updated location in a manner that reduces a rate of change of the dynamically updated location.

17. The system of claim 11, wherein the one or more processors are configured to generate the representation of the digital element in the augmented reality rendered view including by being configured to calculate a directional heading value of the digital element based at least in part on a determined geographical location of the augmented reality observing platform.

18. The system of claim 11, wherein the capture of the digital element using the augmented reality view is due to a user indication associated with the digital element.

19. The system of claim 11, wherein the one or more processors are configured to provide the content of the digital element in response to receiving the indication associated with the capture of the digital element by the user including by being configured to award the content of the digital element to the user.

20. A computer program product for rendering a digital element, the computer program product being embodied in a non-transitory computer readable storage medium and comprising computer instructions for:

identifying the digital element located within a region near a device, wherein the digital element is virtually located at a dynamically updated location with real-world physical longitude and latitude components that dynamically change over time for the same digital element, but a vertical location of the digital element is specified relative to an augmented reality observing platform;

determining that the digital element is to be rendered;

obtaining a captured image of at least a portion of the region using a camera of the device;

generating at the vertical location specified relative to the augmented reality observing platform, a representation of the digital element that has been found by a user but not yet captured by the user in a rendered augmented reality view provided via the augmented reality observing platform using at least a portion of the captured image obtained using the camera of the device; and providing content of the digital element to the user in response to receiving an indication associated with a capture of the digital element by the user using the augmented reality view.

* * * * *